United States Patent
Nomura et al.

(10) Patent No.: US 6,657,793 B2
(45) Date of Patent: Dec. 2, 2003

(54) LENS BARREL

(75) Inventors: Hiroshi Nomura, Saitama (JP);
Takamitsu Sasaki, Saitama (JP);
Kazunori Ishizuka, Kanagawa (JP);
Maiko Takashima, Tokyo (JP)

(73) Assignee: Pentax Corporation, Tokyo (JP)

( * ) Notice: Subject to any disclaimer, the term of this patent is extended or adjusted under 35 U.S.C. 154(b) by 9 days.

(21) Appl. No.: 09/961,232

(22) Filed: Sep. 24, 2001

(65) Prior Publication Data

US 2002/0036837 A1 Mar. 28, 2002

(30) Foreign Application Priority Data

Sep. 27, 2000 (JP) .................................... 2000-293761

(51) Int. Cl.⁷ ............................................. G02B 15/14
(52) U.S. Cl. ....................... 359/694; 359/703; 359/704; 359/823
(58) Field of Search ................. 359/694, 703, 359/704, 705, 819, 821–823

(56) References Cited

U.S. PATENT DOCUMENTS

| | | | |
|---|---|---|---|
| 4,227,792 A | 10/1980 | Rentschler | 396/460 |
| 4,390,262 A | 6/1983 | Hirohata et al. | 396/963 |
| 4,416,527 A | 11/1983 | Okura | 396/510 |
| 4,426,145 A | 1/1984 | Hashimoto | 396/132 |
| 4,484,800 A | 11/1984 | Tamura | 359/699 |
| 4,576,446 A | 3/1986 | Kamata | 359/703 |
| 4,595,081 A | 6/1986 | Parsons | 185/40 R |
| 4,662,241 A | 5/1987 | Edwards | 475/206 |
| 4,834,514 A | 5/1989 | Atsuta et al. | 359/699 |
| 4,839,680 A | 6/1989 | Amada et al. | 396/451 |
| 4,917,482 A | 4/1990 | Ito | 359/690 |
| 4,918,480 A | 4/1990 | Hori | 396/132 |
| 4,922,274 A | 5/1990 | Yamamoto et al. | 396/508 |
| 4,971,427 A | 11/1990 | Takamura et al. | 359/700 |
| 4,975,725 A | 12/1990 | Morisawa | 396/132 |
| 4,978,204 A | 12/1990 | Ito | 359/689 |
| 4,984,877 A | 1/1991 | Ito | 359/692 |
| 4,993,815 A | 2/1991 | Yamazaki et al. | 359/699 |
| 5,037,187 A | 8/1991 | Oda et al. | 359/699 |
| 5,126,883 A | 6/1992 | Sato et al. | 359/683 |
| 5,144,352 A | 9/1992 | Shono | 396/132 |
| 5,166,829 A | 11/1992 | Iizuka | 359/699 |
| 5,177,638 A | 1/1993 | Emura et al. | 359/704 |

(List continued on next page.)

FOREIGN PATENT DOCUMENTS

| | | | |
|---|---|---|---|
| JP | 4-340907 | 11/1992 | |
| JP | 8-146296 | 6/1996 | G02B/15/20 |
| JP | 2000-275518 | 10/2000 | G02B/15/16 |

OTHER PUBLICATIONS

English Language Abstract of JP 4–340907.
English Language Abstract of JP 2000–275518.
English Language Abstract of JP 8–146296.

*Primary Examiner*—Jordan M. Schwartz
*Assistant Examiner*—Jessica Stultz
(74) *Attorney, Agent, or Firm*—Greenblum & Bernstein, P.L.C.

(57) ABSTRACT

A lens barrel having a zoom lens system including variable power lens groups, at least one of which includes a switching lens group having two sub-lens groups, the lens barrel includes a first sub-lens group frame for supporting one of the sub-lens groups; a second sub-lens group frame for supporting the other sub-lens group; a switching lens group frame for supporting the first and second sub-lens group frames; a lens shutter mechanism secured to the switching lens group frame on the image side of the second sub-lens group frame; and a focusing mechanism for making the second sub-lens group frame advance or retreat, with respect to a reference position provided by the lens shutter mechanism secured to the switching lens group frame. The first and second sub-lens group frames are integrally moved along in the optical axis direction via the focusing mechanism.

5 Claims, 28 Drawing Sheets

U.S. PATENT DOCUMENTS

| | | | | |
|---|---|---|---|---|
| 5,196,963 A | * | 3/1993 | Sato et al. | 359/699 |
| 5,222,407 A | | 6/1993 | Sekiguchi | 74/411 |
| 5,237,357 A | | 8/1993 | Morisawa | 396/449 |
| 5,241,422 A | | 8/1993 | Shimada et al. | 359/704 |
| 5,268,794 A | | 12/1993 | Chan | 359/699 |
| 5,301,066 A | * | 4/1994 | Higuchi et al. | 359/698 |
| 5,313,244 A | | 5/1994 | Arai | 396/132 |
| 5,461,443 A | | 10/1995 | Nakayama et al. | 396/89 |
| 5,559,571 A | | 9/1996 | Miyamoto et al. | 396/52 |
| 5,572,276 A | | 11/1996 | Hirakawa | 359/684 |
| 5,589,987 A | | 12/1996 | Tanaka | 359/701 |
| 5,646,790 A | | 7/1997 | Kohmoto et al. | 359/823 |
| 5,671,449 A | | 9/1997 | Shimizu | 396/132 |
| 5,701,208 A | | 12/1997 | Sato et al. | 359/822 |
| 5,708,533 A | | 1/1998 | Hamasaki | 359/700 |
| 5,739,962 A | | 4/1998 | Asakura et al. | 359/700 |
| 5,774,266 A | | 6/1998 | Otani et al. | 359/554 |
| 5,774,748 A | | 6/1998 | Ito et al. | 396/80 |
| 5,812,889 A | | 9/1998 | Nomura et al. | 396/87 |
| 5,842,057 A | | 11/1998 | Nomura et al. | 396/87 |
| 5,870,232 A | | 2/1999 | Tsuji et al. | 359/700 |
| 5,892,998 A | | 4/1999 | Kodaira et al. | 396/448 |
| 5,933,285 A | | 8/1999 | Sato et al. | 359/694 |
| 6,028,714 A | | 2/2000 | Koyama | 359/683 |
| 6,069,745 A | * | 5/2000 | Fujii et al. | 359/694 |
| 6,089,760 A | | 7/2000 | Terada | 396/463 |
| 6,118,666 A | | 9/2000 | Aoki et al. | 361/749 |
| 6,125,237 A | | 9/2000 | Park | 396/79 |
| 6,160,670 A | | 12/2000 | Nakayama et al. | 359/696 |
| 6,176,627 B1 | | 1/2001 | Suh | 396/451 |
| 6,195,211 B1 | | 2/2001 | Iwasaki | 359/694 |
| 6,369,955 B1 | | 4/2002 | Enomoto et al. | 359/685 |
| 6,424,469 B2 | | 7/2002 | Hirai | 359/699 |
| 6,429,979 B2 | | 8/2002 | Enomoto | 359/692 |
| 6,437,922 B2 | | 8/2002 | Enomoto et al. | 359/685 |
| 6,437,924 B1 | | 8/2002 | Azegami | 359/694 |
| 6,456,442 B1 | | 9/2002 | Enomoto | 359/689 |
| 6,456,445 B2 | | 9/2002 | Nomura et al. | 359/699 |
| 6,469,840 B2 | | 10/2002 | Nomura et al. | 359/699 |
| 6,469,841 B2 | | 10/2002 | Nomura et al. | 359/699 |
| 6,493,511 B2 | | 12/2002 | Sato | 396/72 |
| 6,512,638 B2 | | 1/2003 | Sato et al. | 359/701 |
| 6,522,478 B2 | | 2/2003 | Nomura et al. | 359/694 |
| 6,522,481 B2 | | 2/2003 | Nomura et al. | 359/699 |
| 6,522,482 B2 | | 2/2003 | Nomura et al. | 359/701 |
| 2002/0012178 A1 | | 1/2002 | Noguchi | 359/811 |
| 2002/0036836 A1 | | 3/2002 | Hagimori | 359/694 |

* cited by examiner

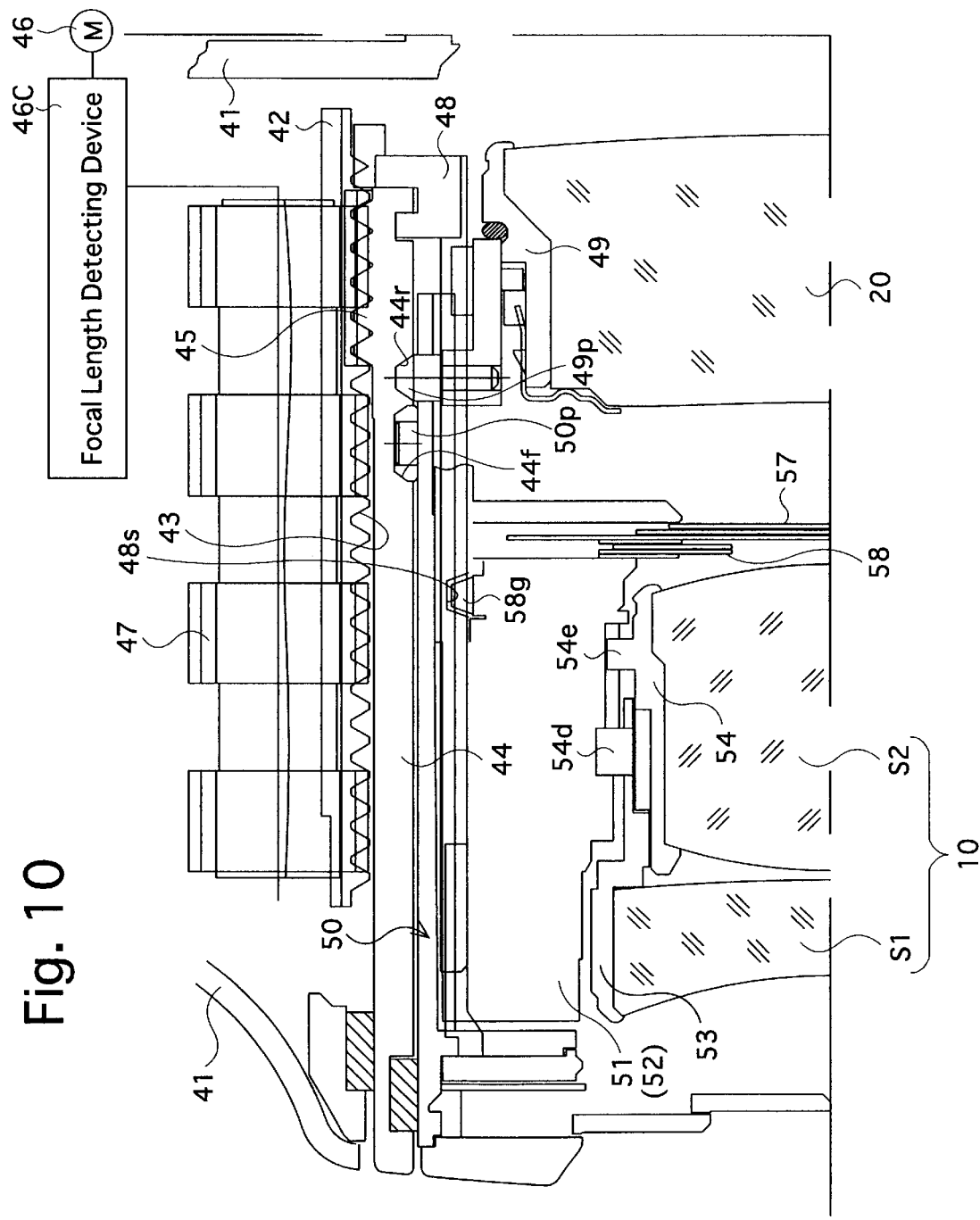

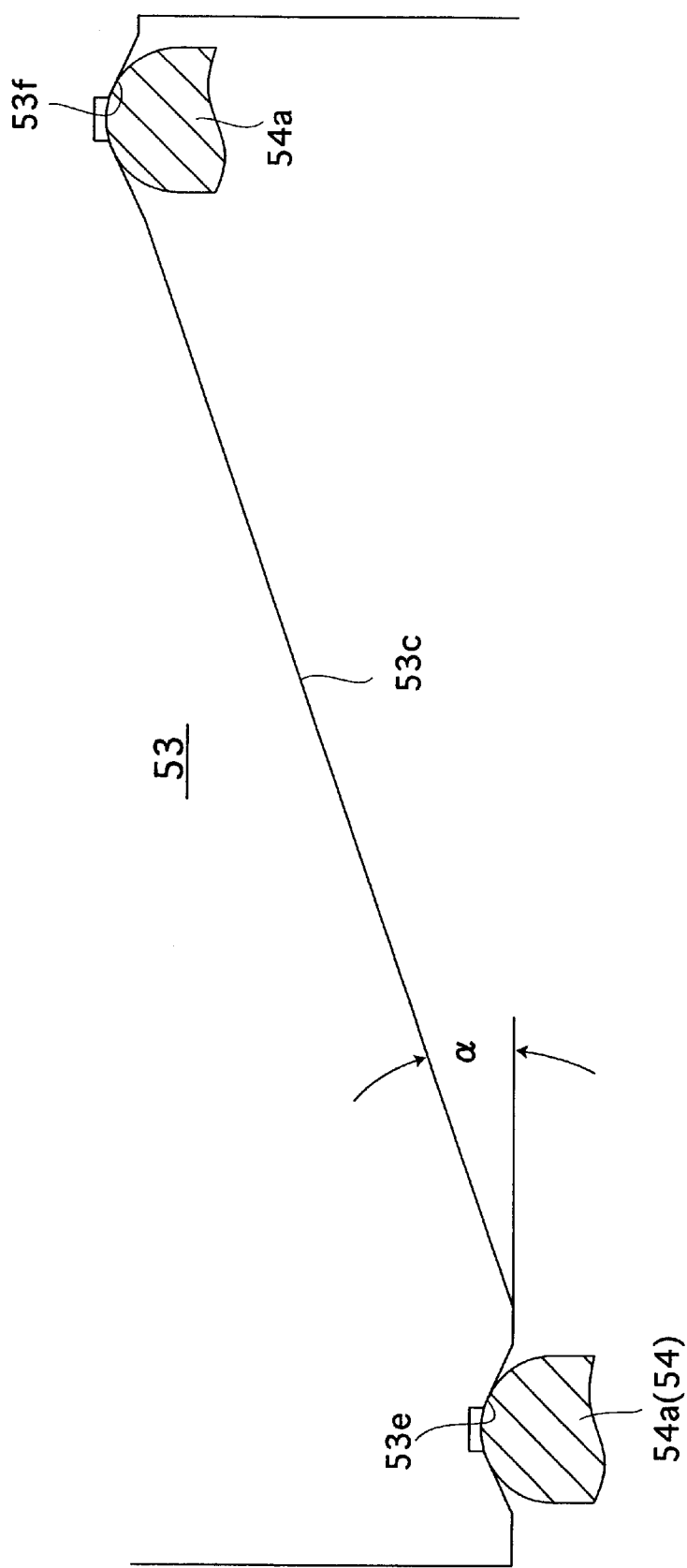

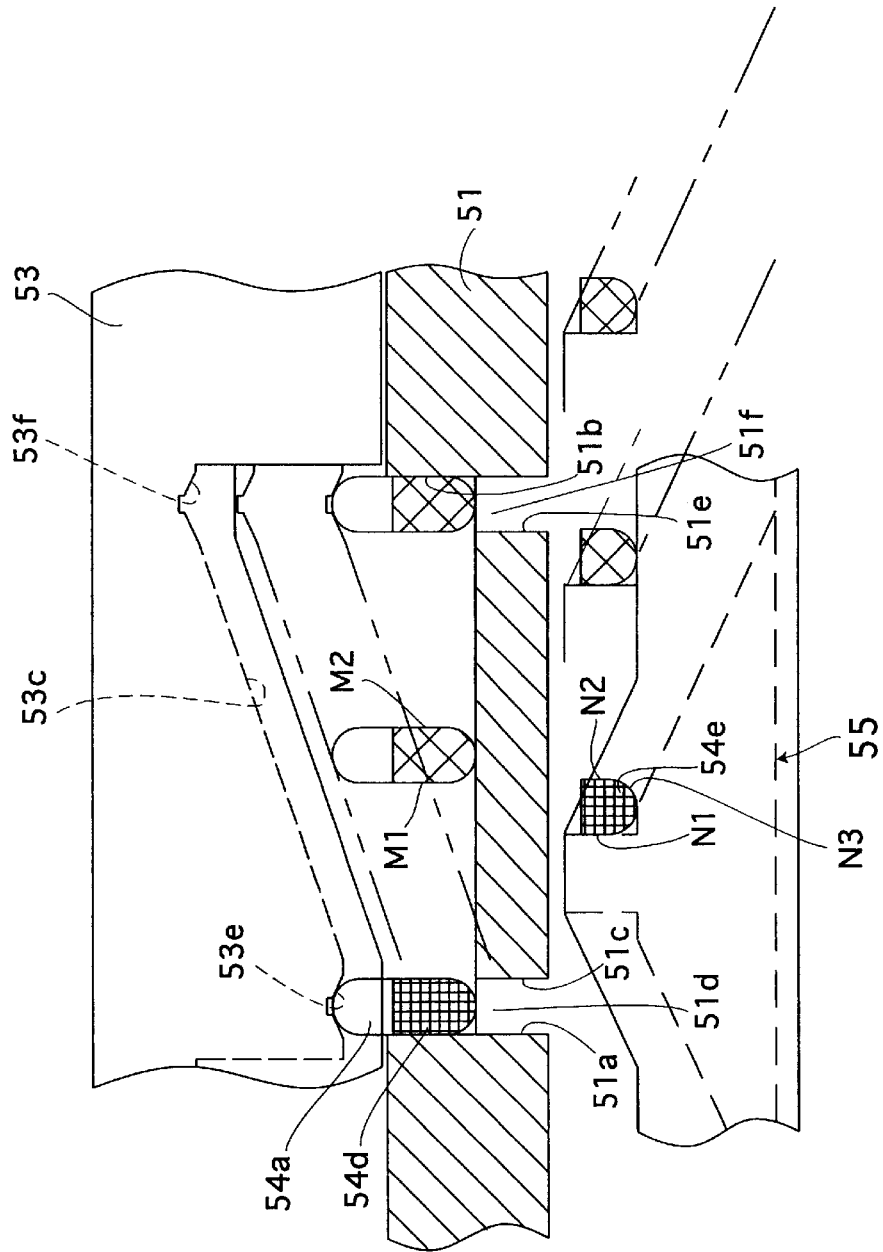

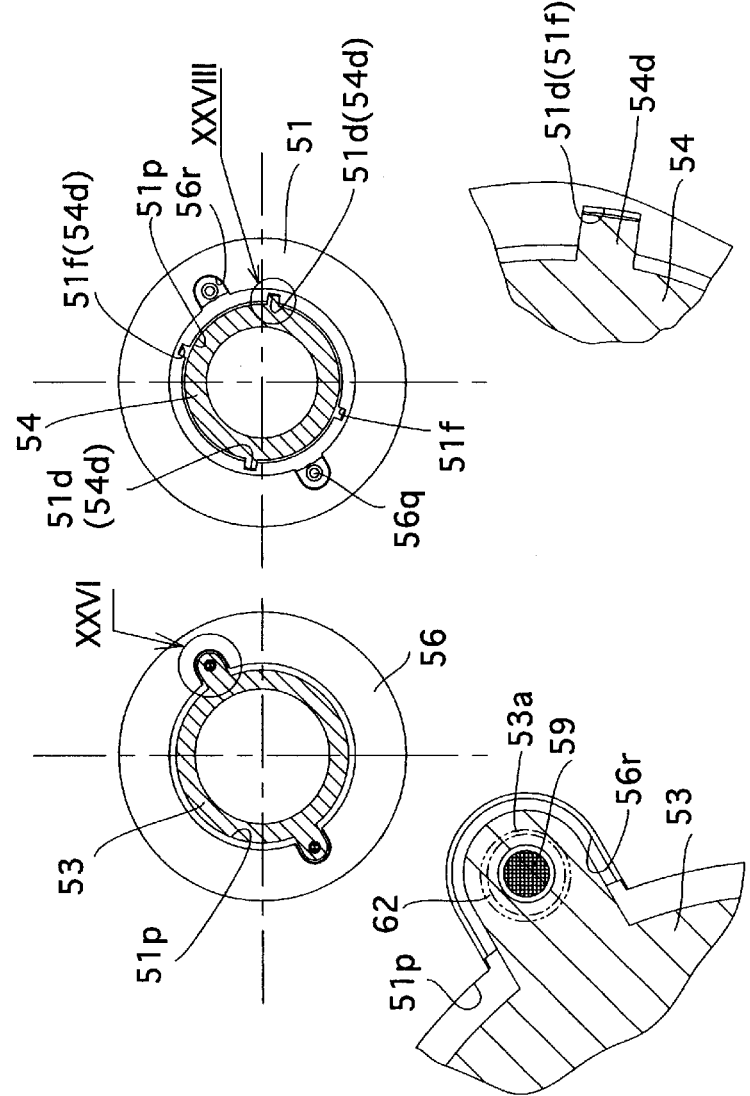

LENS BARREL

CROSS-REFERENCE TO RELATED APPLICATIONS

The present application relates to the following U.S. patent applications, all filed concurrently herewith on Sep. 24, 2001, and all of which are expressly incorporated herein by reference in their entireties: "ZOOM LENS MECHANISM" having U.S. application Ser. No. 09/960,308, "ZOOM LENS MECHANISM" having U.S. application Ser. No. 09/961,231, "ECCENTRICITY-PREVENTION MECHANISM FOR A PAIR OF LENS-SUPPORTING RINGS" having U.S. application Ser. No. 09/960,515, "REDUCTION GEAR MECHANISM" U.S. application Ser. No. 09/960,521, "RING MEMBER SHIFT MECHANISM AND LENS GROUP SHIFT MECHANISM" having U.S. application Ser. No. 09/960,518, "LENS BARREL" having U.S. application Ser. No. 09/960,520, "LENS BARREL" having U.S. application Ser. No. 09/960,382, "LENS BARREL" having U.S. application Ser. No. 09/960,516, "LENS BARREL" having U.S. application Ser. No. 09/961,233, and "ZOOM LENS BARREL" having U.S. application Ser. No. 09/961,185, each naming as inventors Hiroshi NOMURA et al.; and "LENS DRIVE CONTROL APPARATUS FOR ZOOM LENS SYSTEM HAVING A SWITCHING LENS GROUP" having U.S. application Ser. No. 09/961,186 and naming as inventor Norio NUMAKO.

BACKGROUND OF THE INVENTION

1. Field of the Invention

The present invention relates to a lens barrel suitable for use with a zoom lens system such as that proposed by the assignee of the present application in U.S. patent application No. 09/534,307 (Japanese Patent Application No. Hei 11-79572).

2. Description of the Related Art

In a zoom lens system of the prior art, there are contradictory demands for a high zoom ratio and miniaturization. For example, in a two-lens-group zoom lens system which can be miniaturized, if the paths of the lens groups thereof (hereinafter, zoom paths) are determined (i.e., solutions for zoom paths) so that the zoom ratio becomes high, interference of the lens groups occurs on the telephoto side, or interference of a lens group and the image plane occurs on the wide-angle side. On the other hand, in a three-lens-group zoom lens system, the zoom ratio thereof can be made higher than that of a two-lens-group zoom lens system; however, miniaturization is difficult. Furthermore, if an attempt is made to obtain a higher zoom ratio, and if the power of these three lens groups is determined accordingly, precision on the operations of the zoom lens system cannot be obtained due to the mechanical structure thereof.

The assignee of the present application has proposed an unprecedented zoom lens system that meets the contradictory demands of high zoom ratio and miniaturization (U.S. patent application No. 09/534,307). This zoom lens system has the following characteristics: it includes a plurality of movable lens groups for varying the focal length; at least one of the lens groups is a switching lens group which includes two sub-lens groups, one of the sub-lens groups being a movable sub-lens group that can be selectively positioned at either one movement extremities in the optical axis direction with respect to the other sub-lens group; the movable sub-lens group of the switching lens group is positioned at an extremity of a short-focal-length zooming range, from the short focal length extremity to an intermediate focal length, and at the opposite extremity of a long-focal-length zooming range, from the intermediate focal length to a long focal length extremity; and zoom paths of the switching lens group and the other lens groups are discontinuous at the intermediate focal length and are defined to focus on a predetermined image plane corresponding to the position of the movable sub-lens group. There may be one or more intermediate focal lengths.

SUMMARY OF THE INVENTION

Accordingly, it is an object of the present invention to provide a lens barrel suitable for use with a zoom lens system that includes the switching lens group as described above.

In order to achieve the above-mentioned object, a lens barrel having a zoom lens system is provided, the zoom lens system including a plurality of variable power lens groups which are movable in an optical axis direction for varying the focal length of the zoom lens system; wherein at least one of the variable power lens groups includes a switching lens group having two sub-lens groups, one of the sub-lens groups constituting a movable sub-lens group that is selectively positioned at one of two movement extremities, in the optical axis direction, with respect to the other of the sub-lens groups; the movable sub-lens group of the switching lens group is positioned at one of the movement extremities in a short-focal-length side zooming range from a short focal length extremity to an intermediate focal length, and at the other of the movement extremities in a long-focal-length side zooming range from the intermediate focal length to a long-focal-length extremity; zoom paths of the two sub-lens groups of the switching lens group and the other of the variable power lens groups are discontinuous at the intermediate focal length and are defined so that the zoom lens system forms an image on a predetermined image plane in accordance with a position of the movable sub-lens group; and the switching lens group is a focusing lens group which integrally advances and retreats in the optical axis direction regardless of the zooming range. The lens barrel includes a first sub-lens group frame for supporting one of the sub-lens groups; a second sub-lens group frame for supporting the other of the sub-lens groups; a switching lens group frame for supporting the first sub-lens group frame and the second sub-lens group frame in this order from object side in such a manner that allows the first and second sub-lens group frames to move in the optical axis direction; a lens shutter mechanism secured to the switching lens group frame on the image side of the second sub-lens group frame; and a focusing mechanism for making the second sub-lens group frame advance or retreat, depending on the object distance, with respect to a reference position provided by the lens shutter mechanism secured to the switching lens group frame. The first sub-lens group frame is moved along with the second sub-lens group frame in the optical axis direction in the long-focal-length zooming range and in the short-focal-length zooming range via the focusing mechanism.

In an embodiment, the first sub-lens group frame is maintained in a mutually close position with respect to the second sub-lens group frame in the long-focal-length zooming range and maintained in a mutually distant position with respect to the second sub-lens group frame in the short-focal-length zooming range; and the first sub-lens group frame is moved along integrally with the second sub-lens group frame by the focusing mechanism in the optical axis direction, in the mutually close position and in the mutually distant position.

In an embodiment, the switching lens group frame is moved so that the path of the lens shutter mechanism is not discontinuous between the short-focal-length zooming range and the long-focal-length zooming range, which extend on both sides of the intermediate focal length.

In an embodiment, a diaphragm mechanism is further secured to the switching lens group frame on the object side of the lens shutter mechanism.

According to another aspect of the present invention, a lens barrel having a zoom lens system, the zoom lens system including a plurality of variable power lens groups which are movable in an optical axis direction for varying the focal length of the zoom lens system, at least one of the variable power lens groups including a switching lens group having two sub-lens groups functioning optically in a mutually close position and in a mutually distant position, in the optical axis direction, the lens barrel includes a first sub-lens group frame for supporting one of the sub-lens groups; a second sub-lens group frame for supporting the other of the sub-lens groups; a switching lens group frame for supporting the first sub-lens group frame and the second sub-lens group frame in this order from object side in such a manner that allows the first and second sub-lens group frames to move in the optical axis direction; a lens shutter mechanism secured to the switching lens group frame on the image side of the second sub-lens group frame; and a focusing mechanism for making the second sub-lens group frame advance or retreat, depending on object distance, with respect to a reference position provided by the lens shutter mechanism secured to the switching lens group frame. The first sub-lens group frame is moved along with the second sub-lens group frame in the optical axis direction in the long-focal-length zooming range and in the short-focal-length zooming range via the focusing mechanism.

The present disclosure relates to subject matter contained in Japanese Patent Application No. 2000-293761 (filed on Sep. 27, 2000) which is expressly incorporated herein in its entirety.

BRIEF DESCRIPTION OF THE DRAWINGS

FIG. 10 is a cross-sectional view showing an embodiment of a zoom lens barrel which includes the zoom lens systems having switching lens groups shown in FIGS. 1, 8 and 9.

FIG. 23 is an enlarged expanded view showing a face cam of a first sub-lens group frame.

FIG. 24 is an enlarged developed view showing the relationship of the first sub-lens group frame, the second sub-lens group frame, and the actuator ring with respect to a front shutter retaining ring.

FIG. 25 is a front view showing the relationship between the first sub-lens group frame and the front shutter retaining ring when viewed in a direction of the arrows indicated by a line XXV—XXV in FIG. 14.

FIG. 26 is a partially enlarged view showing an encircled portion indicated by XXVI in FIG. 25.

FIG. 27 is a front view showing the relationship between the second sub-lens group frame and the front shutter retaining ring when viewed in a direction of the arrows indicated by the line XXVII—XXVII in FIG. 14.

FIG. 28 is a partially enlarged view showing an encircled part XXVIII in FIG. 27.

DETAILED DESCRIPTION OF THE PREFERRED EMBODIMENTS

First, embodiments of a zoom lens system with a switching lens group proposed in the U.S. patent application No. 09/534,307 will be herein described. U.S. patent application No. 09/534,307 is expressly incorporated herein by reference in its entirety.

Figure 1:
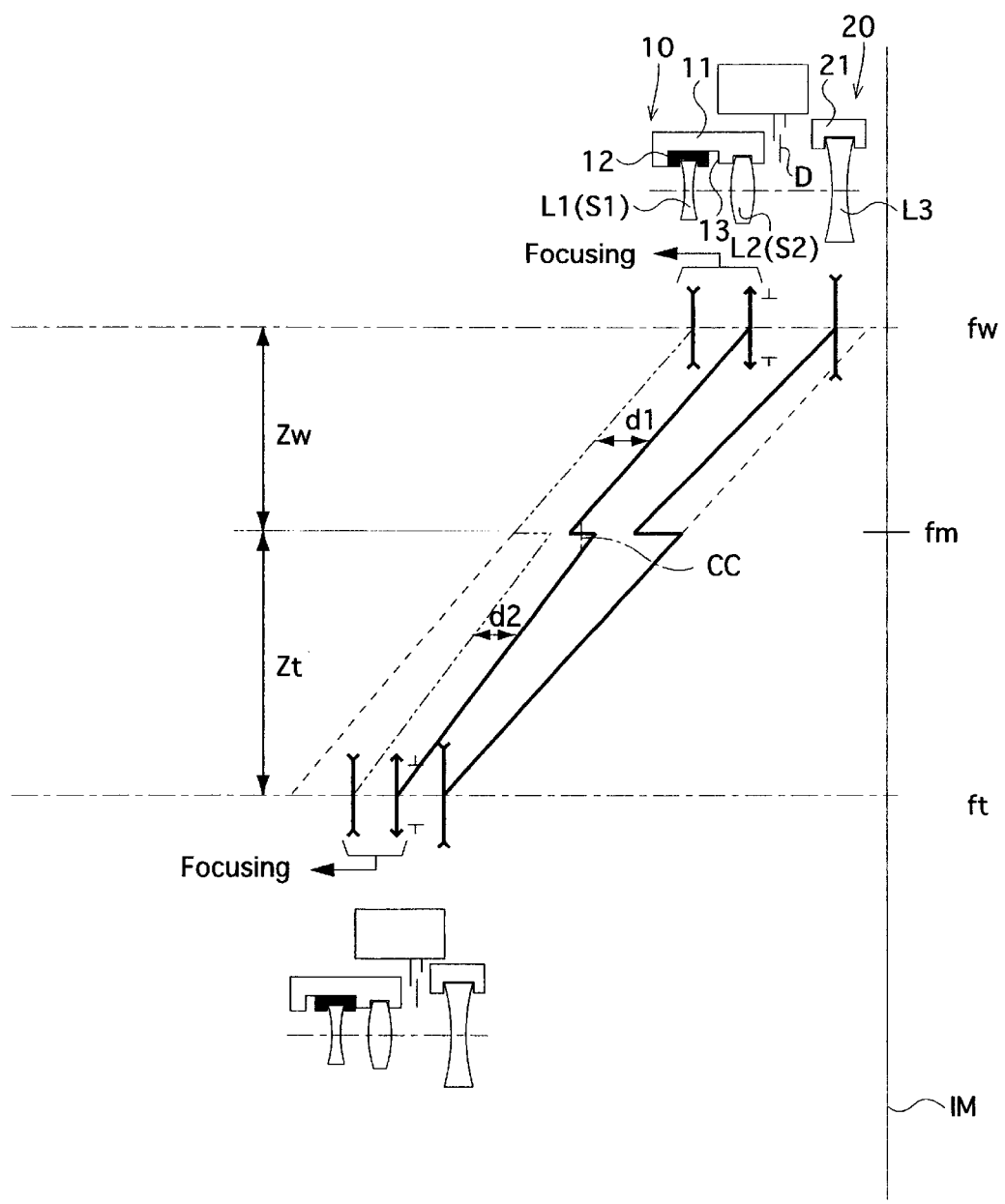
FIG. 1 is a schematic drawing of a first embodiment of a zoom lens system having switching lens groups and the fundamental zoom path thereof, to which the present invention is applied.

FIG. 1 shows the first embodiment of the zoom lens system. The zoom lens system includes a positive first variable lens group 10, and a negative second variable lens group 20, in that order from the object side. The first variable lens group 10 includes a negative first lens group L1 (first sub-lens group S1) and a positive second lens group L2 (second sub-lens group S2), in that order from the object side. The second variable lens group 20 includes a negative third lens group L3. The second sub-lens group S2 of the first variable lens group 10 is fixed to a first lens group frame 11. The first sub-lens group S1 is mounted on a movable sub-lens group frame 12. The movable sub-lens group frame 12 is arranged to move in the optical axis direction, by a predetermined distance, along a guide groove 13 which is formed on the first lens group frame 11. The first sub-lens group S1 is selectively moved to either the object-side movement extremity at which the movable sub-lens group frame 12 comes into contact with the front end of the guide groove 13, or the image-side movement extremity at which the movable sub-lens group frame 12 comes into contact with the rear end of the guide groove 13. The third lens group L3 is fixed to a second lens group frame 21. A diaphragm D is arranged to move together with the first variable lens group 10 (first lens group frame 11). Throughout FIGS. 1 through 9, IM indicates an image plane (film surface, and so forth) which is at a predetermined position.

In the zoom paths according to the first embodiment, the first variable lens group 10 (first lens group frame 11), the second variable lens group 20 (second lens group frame 21), and the first sub-lens group S1 (movable sub-lens group frame 12) move in the following manner:

[A] In a short-focal-length zooming range Zw from the short focal length extremity fw to an intermediate focal length fm, the first sub-lens group S1 and the second sub-lens group S2 maintain a distance d1 therebetween (first separation space/wide space); and the first variable lens group 10 (first lens group frame 11) and the second variable lens group 20 (second lens group frame 21) move towards the object side while mutually changing the distance therebetween.

[B] At the intermediate focal length fm, the first variable lens group 10 and the second variable lens group 20 move towards the image side at the long focal-length extremity of the short-focal-length zooming range Zw; and the first sub-lens group S1 moves to the image-side movement extremity of the guide groove 13, wherein the first sub-lens group S1 moves toward the second sub-lens group S2 so that the distance therebetween is determined by a shorter distance (second separation space/narrow space) d2.

[C] In a long-focal-length zooming range Zt from the intermediate focal length fm to the long focal length extremity ft, the first sub-lens group S1 maintains the shorter distance (second separation space/narrow space) d2 with respect to the second sub-lens group S2; and the first variable lens group 10 and the second variable lens group 20 move towards the object, based on the positions thereof which are determined at the intermediate focal length fm, after the first through third lens groups L1 through L3 have been moved towards the image side, while changing the distance therebetween.

The zoom paths for the first variable lens group 10 and the second variable lens group 20 are simply depicted as straight lines in FIG. 1. It should be noted, however, that the actual zoom paths are not necessarily straight lines.

Focusing is performed by integrally moving, in the optical axis direction, the first sub-lens group S1 and the second sub-lens group S2, i.e., the first variable lens group 10 (first lens group frame 11) regardless of the zooming range.

Figure 2:
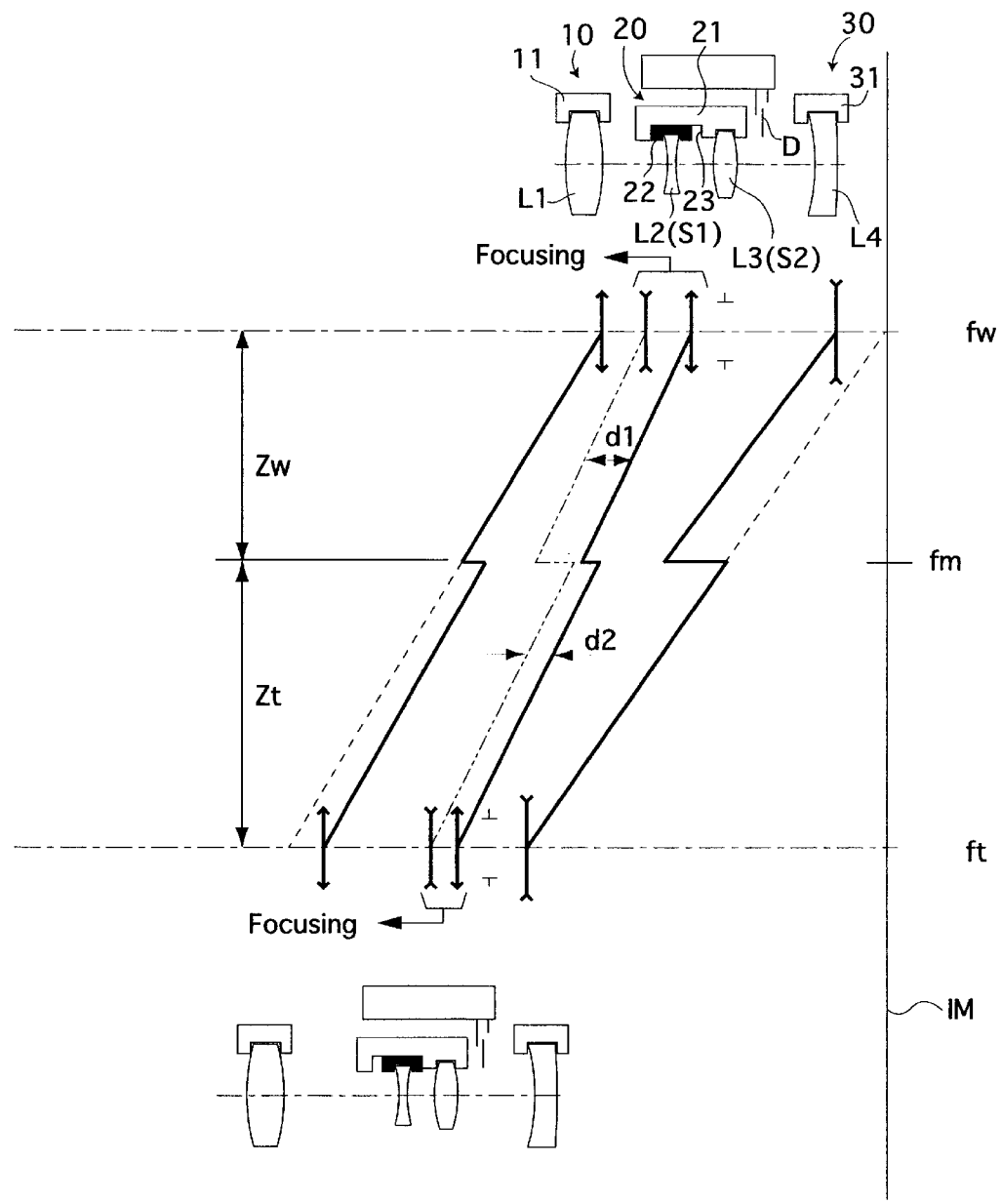
FIG. 2 is a schematic drawing of a second embodiment of a zoom lens system having switching lens groups and the fundamental zoom path thereof, to which the present invention is applied.

FIG. 2 shows the second embodiment of the zoom lens system. The zoom lens system includes a positive first variable lens group 10, a positive second variable lens group 20, and a negative third variable lens group 30, in that order from the object side. The first variable lens group 10 includes a positive first lens group L1. The second variable lens group 20 includes a negative second lens group L2 (first sub-lens group S1) and a positive third lens group L3 (second sub-lens group S2), in that order from the object side. The third variable lens group 30 includes a negative fourth lens group L4. The first lens group L1 is fixed to a first lens group frame 11. The second sub-lens group S2 of the second variable lens group 20 is fixed to a second lens group frame 21. The first sub-lens group S1 is mounted on a movable sub-lens group frame 22. The movable sub-lens group frame 22 is arranged to move, in the optical axis direction, by a predetermined distance, along a guide groove 23 which is formed on the second lens group frame 21. The first sub-lens group S1 is selectively moved to either the object-side movement extremity at which the movable sub-lens group frame 22 comes into contact with the front end of the guide groove 23, or the image-side movement extremity at which the movable sub-lens group frame 22 comes into contact with the rear end of the guide groove 23. The fourth lens group L4 is fixed to a third lens group frame 31. A diaphragm D is arranged to move together with the second variable lens group 20 (second lens group frame 21).

In the zoom paths according to the second embodiment, the first variable lens group 10 (first lens group frame 11) the second variable lens group 20 (second lens group frame 21), the third variable lens group 30 (third lens group frame 31), and the first sub-lens group S1 (movable sub-lens group frame 22) move in the following manner:

[A] In a short-focal-length zooming range Zw from the short focal length extremity fw to an intermediate focal length fm, the first sub-lens group S1 and the second sub-lens group S2 maintain a distance d1 (first separation space/wide space); and the first variable lens group 10 (first lens group frame 11), the second variable lens group 20 (second lens group frame 21) and the third variable lens group 30 (third lens group frame 31) move towards the object side while mutually changing the distances therebetween.

[B] At the intermediate focal length fm, the first variable lens group 10, the second variable lens group 20 and the third variable lens group 30 are moved towards the image side at the long focal-length extremity of the short-focal-length zooming range Zw; and the first sub-lens group S1 moves to the image-side movement extremity of the guide groove 23, wherein the first sub-lens group S1 moves toward the second sub-lens group S2 so that the distance therebetween is determined by a shorter distance (second separation space/narrow space) d2.

[C] In a long-focal-length zooming range Zt from the intermediate focal length fm to the long focal length extremity ft, the first sub-lens group S1 and the second sub-lens group S2 maintain the shorter distance d2; and the first variable lens group 10, the second variable lens group 20 and third variable lens group 30 move towards the object side based on the positions thereof which are determined at the intermediate focal length fm, after the first through fourth lens groups 1 through 4 have been moved towards the image side, while changing the distances therebetween.

The zoom paths for the first variable lens group 10, the second variable lens group 20 and the third variable lens group 30 are simply depicted as straight lines in FIG. 2. It should be noted, however, that actual zoom paths are not necessarily straight lines.

Focusing is performed by integrally moving, in the optical axis direction, the first sub-lens group S1 and the second sub-lens group S2, i.e., the second variable lens group 20 (second lens group frame 21) regardless of the zooming range.

Likewise with the first embodiment, the zoom paths are discontinuous at the intermediate focal length fm; however, a solution for continuously forming a correct image plane exists by appropriately determining the positions of the first lens group L1, the first sub-lens group S1 (second lens group L2) and the second sub-lens group S2 (third lens group L3) and the fourth lens group L4 respectively at the short focal length extremity fw, the intermediate focal length fm (discontinuous line) and the long focal length extremity ft. According to such a zoom path, a miniaturized zoom lens system having a high zoom ratio can be obtained.

Figure 3:
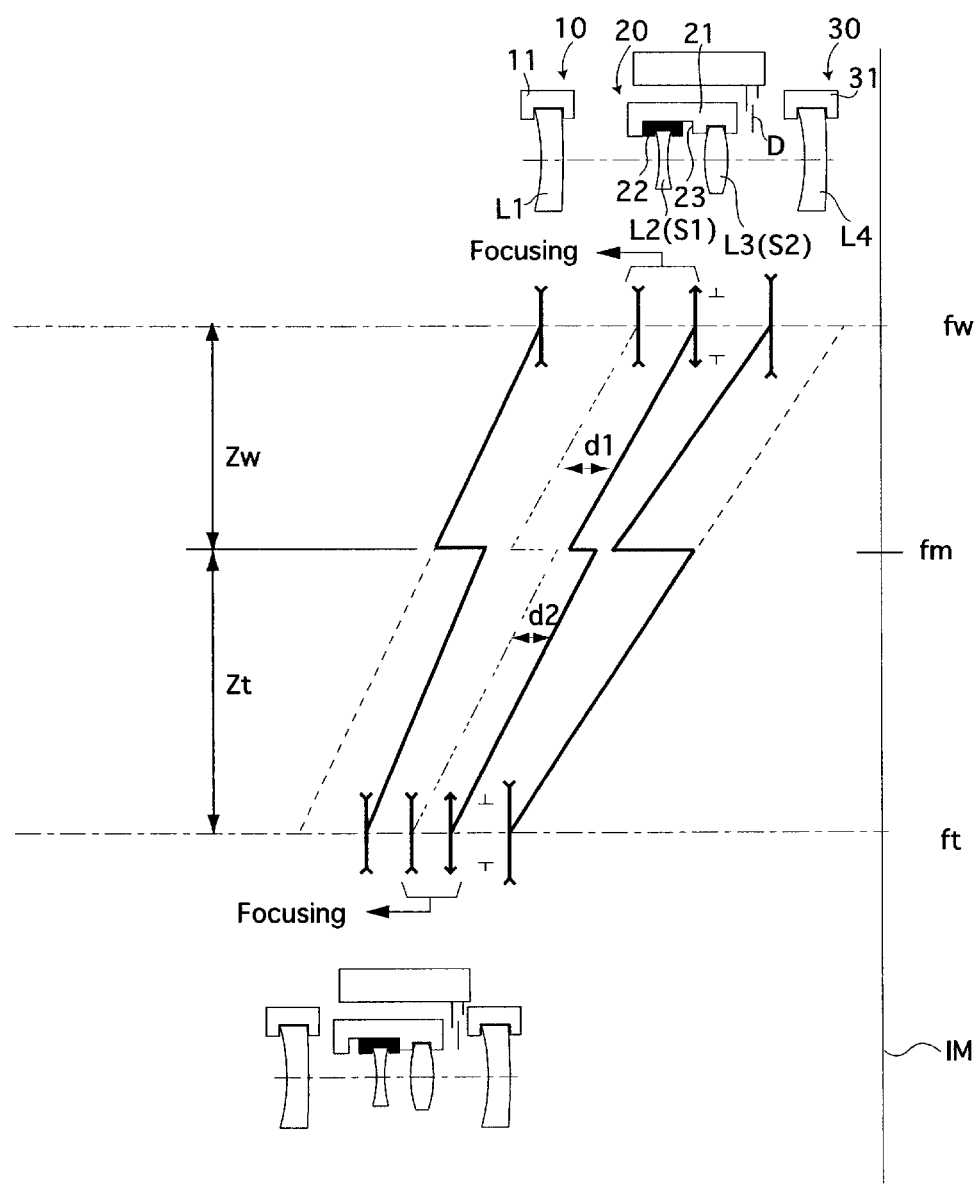
FIG. 3 is a schematic drawing of a third embodiment of a zoom lens system having switching lens groups and the fundamental zoom path thereof, to which the present invention is applied.

FIG. 3 shows the third embodiment of the zoom lens system with a switching lens system. In this embodiment, the first lens group L1 is constructed so as to have negative refractive power, which is the only difference compared with the second embodiment. Apart from this characteristic, the third embodiment is substantially the same as the second embodiment.

Figure 4:
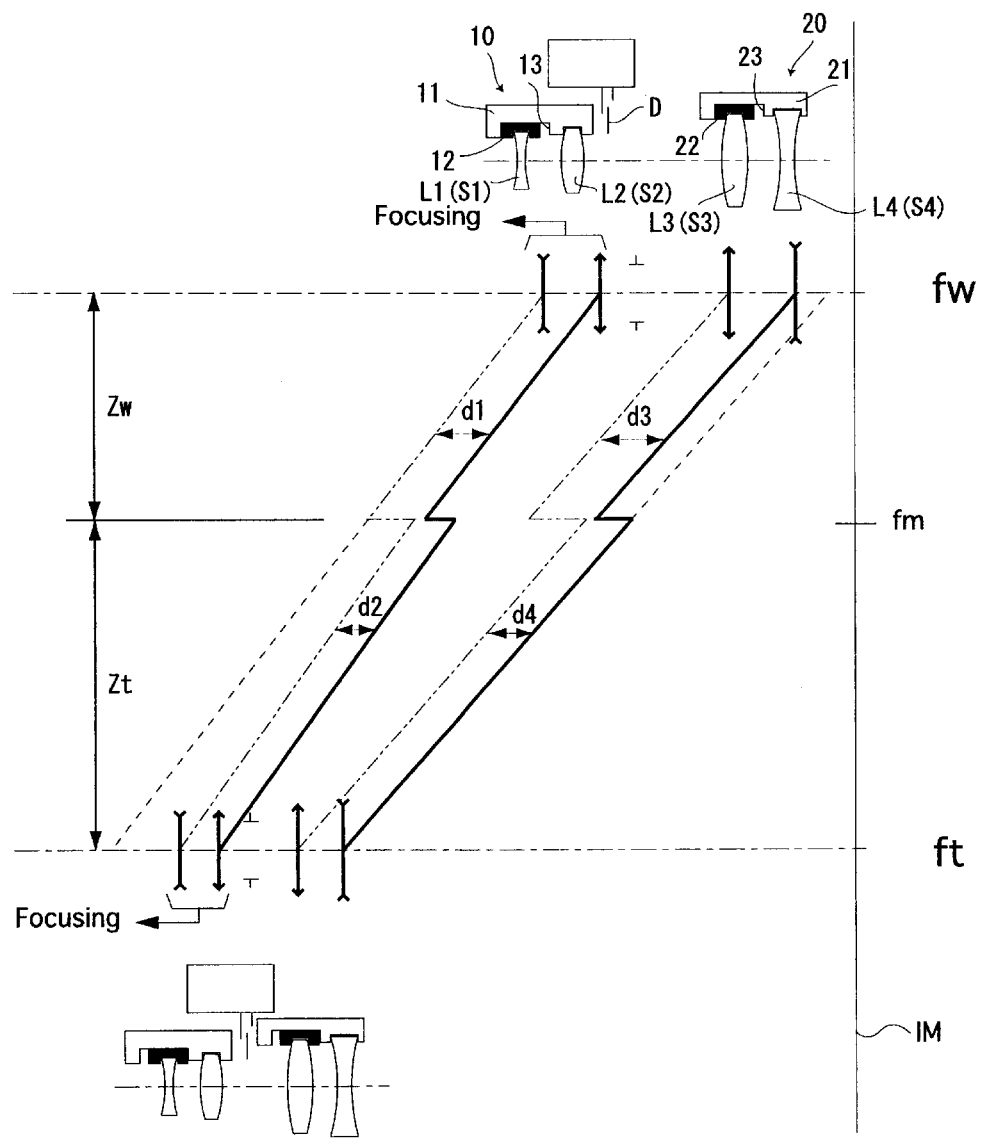
FIG. 4 is a schematic drawing of a fourth embodiment of a zoom lens system having switching lens groups and the fundamental zoom path thereof, to which the present invention is applied.

FIG. 4 shows the fourth embodiment of the zoom lens system with a switching lens group. The zoom lens system includes a positive first variable lens group 10, and a negative second variable lens group 20, in that order from the object side. The first variable lens group 10 includes a negative first lens group L1 (first sub-lens group S1) and a positive second lens group L2 (second sub-lens group S2), in that order from the object side. The second variable lens group 20 includes a positive third lens group L3 (third sub-lens group S3) and a negative fourth lens group L4 (fourth sub-lens group S4), in that order from the object side.

The second sub-lens group S2 of the first variable lens group 10 is fixed to a first lens group frame 11. The first sub-lens group S1 is mounted on a movable sub-lens group frame 12. The movable sub-lens group frame 12 is arranged to move in the optical axis direction, by a predetermined distance, along a guide groove 13 which is formed on the first lens group frame 11. The first sub-lens group S1 is selectively moved to either the object-side movement extremity at which the movable sub-lens group frame 12 comes into contact with the front end of the guide groove 13, or the image-side movement extremity at which the movable sub-lens group frame 12 comes into contact with the rear end of the guide groove 13. Similarly, the fourth sub-lens group S4 of the second variable lens group 20 is fixed to a second lens group frame 21. The third sub-lens group S3 is mounted on a movable sub-lens group frame 22. The movable sub-lens group frame 22 is arranged to move in the optical axis direction, by a predetermined distance, along a guide groove 23 which is formed on the second lens group frame 21. The third sub-lens group S3 is selectively moved to either the object-side movement extremity at which the movable sub-lens group frame 22 comes into contact with the front end of the guide groove 23, or the image-side movement extremity at which the movable sub-lens group frame 22 comes into contact with the rear end of the guide groove 23. A diaphragm D is arranged to move together with the first variable lens group 10 (first lens group frame 11).

In the zoom paths according to the fourth embodiment, the first variable lens group 10 (first lens group frame 11), the second variable lens group 20 (second lens group frame 21), the first sub-lens group S1, and the third sub lens group S3 move in the following manner:

[A] In a short-focal-length zooming range Zw from the short focal length extremity fw to an intermediate focal length fm, the first sub-lens group S1 and the second sub-lens group S2 maintain a distance d1 therebetween (first separation space/wide space), and the third sub-lens group S3 and the fourth sub-lens group S4 maintain a distance d3 therebetween (first separation space/wide space); and the first variable lens group 10 (first lens group frame 11) and the second variable lens group 20 (second lens group frame 21) move towards the object side while mutually changing the distance therebetween.

[B] At the intermediate focal length fm, the first variable lens group 10 and the second variable lens group 20 are moved towards the image side at the long focal-length extremity of the short-focal-length zooming range Zw; and the first sub-lens group S1 moves to the image-side movement extremity of the guide groove 13, wherein the first sub-lens group S1 moves toward the second sub-lens group S2 so that the distance therebetween is determined by a shorter distance (second separation space/narrow space) d2, and also the third sub-lens group S3 moves toward the fourth sub-lens group S4 so that the distance therebetween is determined by a shorter distance (second separation space/narrow space) d4.

[C] In a long-focal-length zooming range Zt from the intermediate focal length fm to the long focal length extremity ft, the first sub-lens group S1 and the second sub-lens group S2 maintain the shorter distance d2 therebetween, and the third sub-lens group S3 and the fourth sub-lens group S4 maintain the shorter distance d4 therebetween; and the first variable lens group 10 and the second variable lens group 20 move towards the object side based on the positions thereof which are determined at the intermediate focal length fm, after the first through fourth lens groups L1 through L4 have been moved towards the image side, while changing the distance therebetween.

The zoom paths for the first variable lens group 10 and the second variable lens group 20 are simply depicted as straight lines in FIG. 4. It should be noted, however, that the actual zoom paths are not necessarily straight lines.

Focusing is performed by integrally moving, in the optical axis direction, the first sub-lens group S1 and the second sub-lens group S2, i.e., the first variable lens group 10 (first lens group frame 11) regardless of the zooming range.

Similar to the first through third embodiments, in the fourth embodiment, the zoom paths are discontinuous at the intermediate focal length fm; however, a solution for continuously forming a correct image plane exists by appropriately determining the positions of the first sub-lens group S1 (first lens group L1), the second sub-lens group S2 (second lens group L2), the third sub-lens group S3 (third lens group L3), and the fourth sub-lens group S4 (fourth lens group L4), respectively, at the short focal length extremity fw, the intermediate focal length fm (discontinuous line), and the long focal length extremity ft. According to such a zoom path, a miniaturized zoom lens system having a high zoom ratio can be obtained.

Figure 5:
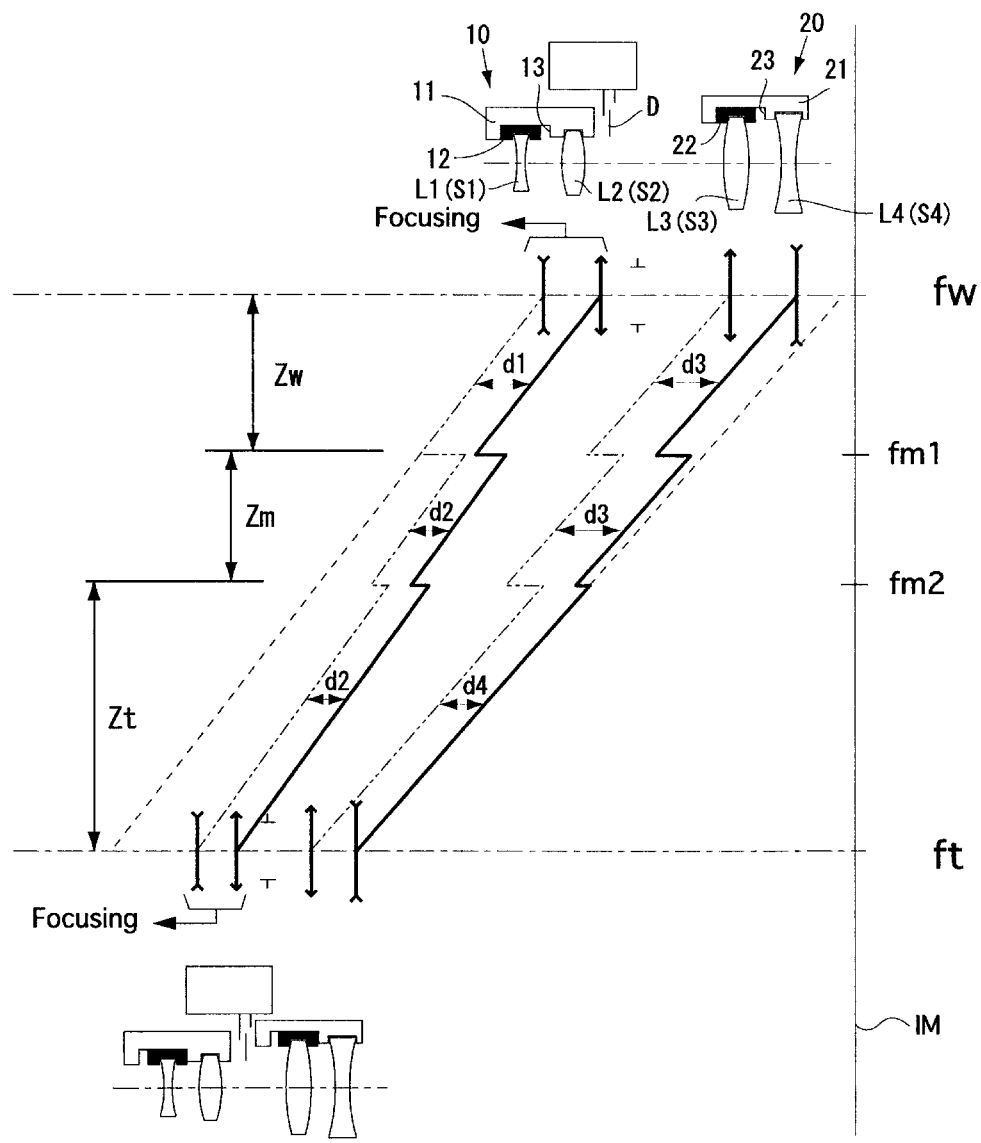
FIG. 5 is a schematic drawing of a fifth embodiment of a zoom lens system having switching lens groups and the fundamental zoom path thereof, to which the present invention is applied.

FIG. 5 shows the fifth embodiment of the zoom lens system with a switching lens group. The zoom lens system includes a positive first variable lens group 10, and a negative second variable lens group 20, in that order from the object side. The first variable lens group 10 includes a negative first lens group L1 (first sub-lens group S1) and a positive second lens group L2 (second sub-lens group S2), in that order from the object side. The second variable lens group 20 includes a positive third lens group L3 (third sub-lens group S3) and a negative fourth lens group L4 (fourth sub-lens group S4), in that order from the object side.

The second sub-lens group S2 of the first variable lens group 10 is fixed to a first lens group frame 11. The first sub-lens group S1 is mounted on a movable sub-lens group frame 12. The movable sub-lens group frame 12 is arranged to move in the optical axis direction, by a predetermined distance, along a guide groove 13 which is formed on the first lens group frame 11. The first sub-lens group S1 is selectively moved to either the object-side movement extremity at which the movable sub-lens group frame 12 comes into contact with the front end of the guide groove 13, or the image-side movement extremity at which the movable sub-lens group frame 12 comes into contact with the rear end of the guide groove 13. Similarly, the fourth sub-lens group S4 of the second variable lens group 20 is fixed to a second lens group frame 21. The third sub-lens group S3 is mounted on a movable sub-lens group frame 22. The movable sub-lens group frame 22 is arranged to move in the optical axis direction, by a predetermined distance, along a guide groove 23 which is formed on the second lens group frame 21. The third sub-lens group S3 is selectively moved to either the object-side movement extremity at which the movable sub-lens group frame 22 comes into contact with the front end of the guide groove 23, or the image-side movement extremity at which the movable sub-lens group frame 22 comes into contact with the rear end of the guide groove 23. A diaphragm D is arranged to move together with the first variable lens group 10 (first lens group frame 11).

In the zoom paths according to the fifth embodiment, the first variable lens group 10 (first lens group frame 11), the second variable lens group 20 (second lens group frame 21), the first sub-lens group S1, and the third sub lens group S3 move in the following manner:

[A] In a short-focal-length zooming range Zw from the short focal length extremity fw to a first intermediate focal length fm1 the first sub-lens group S1 and the second sub-lens group S2 maintain a distance d1 therebetween (first separation space/wide space), and the third sub-lens group S3 and the fourth sub-lens group S4 maintain a distance d3 therebetween (first separation space/wide space); and the first variable lens group 10 (first lens group frame 11) and the second variable lens group 20 (second lens group frame 21) move towards the object side while mutually changing the distance therebetween.

[B] At the first intermediate focal length fm1 the first variable lens group 10 and the second variable lens group 20 are moved towards the image side at the long focal-length extremity of the short-focal-length zooming range Zw; and the first sub-lens group S1 moves to the image-side movement extremity of the guide groove 13, wherein the first sub-lens group S1 moved toward the second sub-lens group S2 so that the distance therebetween is determined by a shorter distance (second separation space/narrow space) d2.

[C] In an intermediate zooming range Zm from the first intermediate focal length fm1 to a second intermediate focal length fm2, the first sub-lens group S1 and the second sub-lens group S2 maintain the shorter distance d2, and the third sub-lens group S3 and the fourth sub-lens group S4 maintain the longer distance d3; and the first variable lens group 10 and the second variable lens group 20 move towards the object side based on the positions thereof which are determined at the first intermediate focal length fm1 after the first through fourth lens groups L1 through L4 have been moved towards the image side, while changing the distance therebetween.

[D] At the second intermediate focal length fm2, the first variable lens group 10 and the second variable lens group 20 are moved towards the image side at the long focal length extremity of the intermediate zooming range Zm; and the third sub-lens group S3 moves to the image-side movement extremity of the guide groove 23, wherein the third sub-lens group S3 moves toward the fourth sub-lens group S4 so that the distance therebetween is determined by a shorter distance (second separation space/narrow space) d4.

[E] In a long-focal-length zooming range Zt from the second intermediate focal length fm2 to the long focal length extremity ft, the first sub-lens group S1 and the second sub-lens group S2 maintain the shorter distance d2 therebetween, and the third sub-lens group S3 and the fourth sub-lens group S4 maintain the shorter distance d4 therebetween; and the first variable lens group 10 and the second variable lens group 20 move towards the object side based on the positions thereof which are determined at the second intermediate focal length fm2, after the first through fourth lens groups L1 through L4 have been moved towards the image side, while changing the distance therebetween.

The zoom paths for the first variable lens group 10 and the second variable lens group 20 are simply depicted as straight lines in FIG. 5. It should be noted, however, that the actual zoom paths are not necessarily straight lines.

Focusing is performed by integrally moving, in the optical axis direction, the first sub-lens group S1 and the second sub-lens group S2, i.e., the first variable lens group 10 (first lens group frame 11) regardless of the zooming range.

Similar to the first through fourth embodiments, in the fifth embodiment, the zoom paths are discontinuous at the first intermediate focal length fm1 and the second intermediate focal length fm2; however, a solution for continuously forming a correct image plane exists by appropriately determining the positions of the first sub-lens group S1 (first lens group L1), the second sub-lens group S2 (second lens group L2), the third sub-lens group S3 (third lens group L3) and the fourth sub-lens group S4 (fourth lens group L4), respectively, at the short focal length extremity fw, the first and second intermediate focal lengths fm1 fm2 (discontinuous line), and the long focal length extremity ft. According to such a zoom path, a miniaturized zoom lens system having a high zoom ratio can be obtained.

Figure 6:
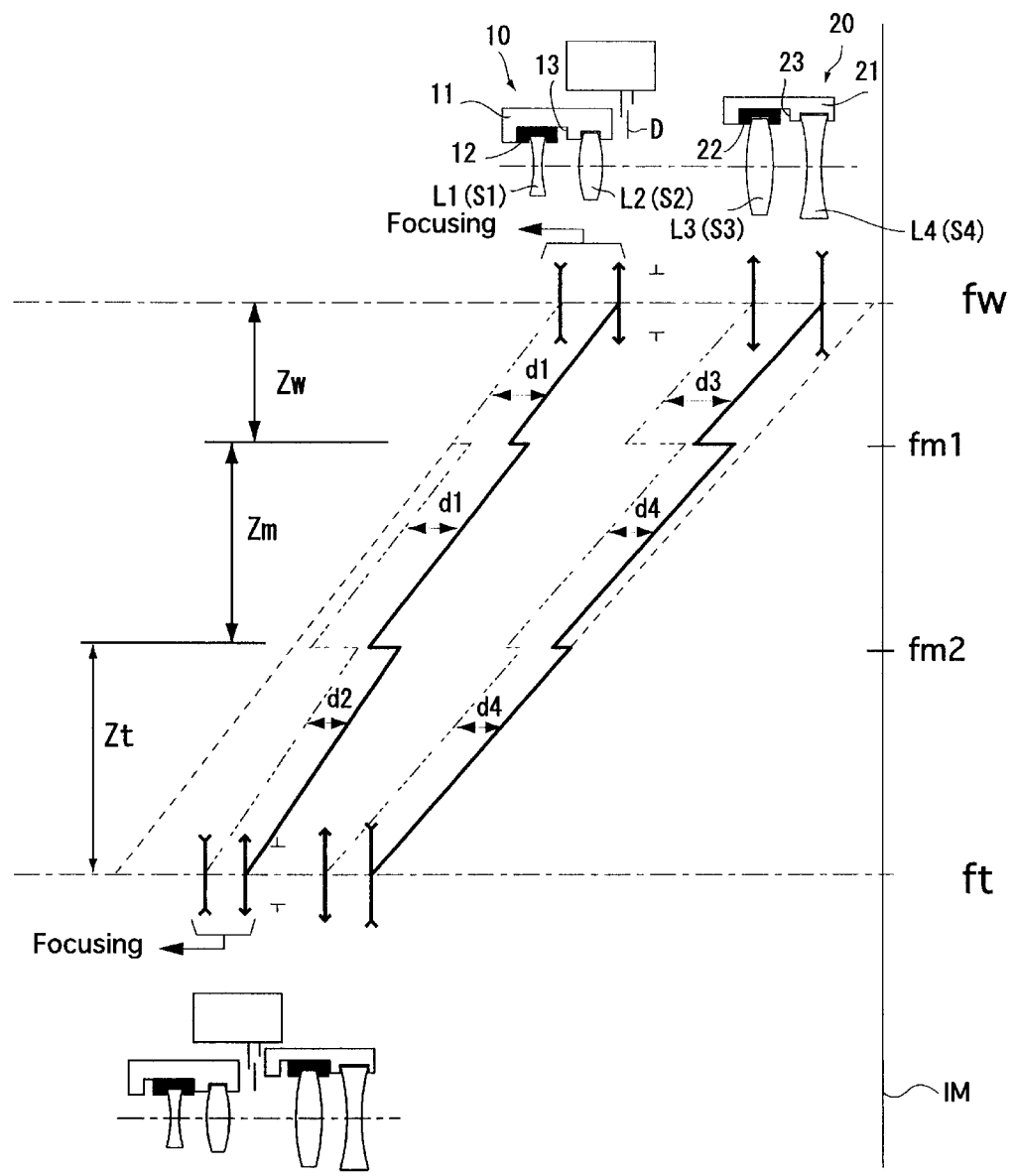
FIG. 6 is a schematic drawing of a sixth embodiment of a zoom lens system having switching lens groups and the fundamental zoom path thereof, to which the present invention is applied.

FIG. 6 shows the sixth embodiment of the zoom lens system with a switching lens group. The zoom lens system includes a positive first variable lens group 10, and a negative second variable lens group 20, in that order from the object side. The first variable lens group 10 includes a negative first lens group L1 (first sub-lens group S1) and a positive second lens group L2 (second sub-lens group S2), in that order from the object side. The second variable lens group 20 includes a positive third lens group L3 (third sub-lens group S3) and a negative fourth lens group L4 (fourth sub-lens group S4), in that order from the object side.

The second sub-lens group S2 of the first variable lens group 10 is fixed to a first lens group frame 11. The first sub-lens group S1 is mounted on a movable sub-lens group frame 12. The movable sub-lens group frame 12 is arranged to move in the optical axis direction, by a predetermined distance, along a guide groove 13 which is formed on the first lens group frame 11. The first sub-lens group S1 is selectively moved to either the object-side movement extremity at which the movable sub-lens group frame 12 comes into contact with the front end of the guide groove 13, or the image-side movement extremity at which the movable sub-lens group frame 12 comes into contact with the rear end of the guide groove 13. Similarly, the fourth sub-lens group S4 of the second variable lens group 20 is fixed to a second lens group frame 21. The third sub-lens group S3 is mounted on a movable sub-lens group frame 22. The movable sub-lens group frame 22 is arranged to move in the optical axis direction, by a predetermined distance, along a guide groove 23 which is formed on the second lens group frame 21. The third sub-lens group S3 is selectively moved to either the object-side movement extremity at which the movable sub-lens group frame 22 comes into contact with the front end of the guide groove 23, or the image-side movement extremity at which the movable sub-lens group frame 22 comes into contact with the rear end of the guide groove 23. A diaphragm D is arranged to move together with the first variable lens group 10 (first lens group frame 11).

In the zoom paths according to the sixth embodiment, the first variable lens group 10 (first lens group frame 11), the second variable lens group 20 (second lens group frame 21), the first sub-lens group S1, and the third sub lens group S3 move in following manner:

[A] In a short-focal-length zooming range Zw from the short focal length extremity fw to a first intermediate focal length fm1 the first sub-lens group S1 and the second sub-lens group S2 maintain a distance d1 therebetween (first separation space/wide space), and the third sub-lens group S3 and the fourth sub-lens group S4 maintain a distance d3 therebetween (first separation space/wide space); and the first variable lens group 10 (first lens group frame 11) and the second variable lens group 20 (second lens group frame 21) move towards the object side while mutually changing the distance therebetween.

[B] At the first intermediate focal length fm1, the first variable lens group 10 and the second variable lens group 20 are moved towards the image side at the long focal length extremity of the short-focal-length zooming range Zw; and the third sub-lens group S3 moves to the image-side movement extremity of the guide groove 23, and wherein the third sub-lens group S3 moves toward the fourth sub-lens group S4 so that the distance therebetween is determined by a shorter distance (second separation space/narrow space) d4.

[C] In an intermediate zooming range Zm from the first intermediate focal length fm1 to a second intermediate focal length fm2, the first sub-lens group S1 and the second sub-lens group S2 maintain the longer distance d1 therebetween, and the third sub-lens group S3 and the fourth sub-lens group S4 maintain the shorter distance d4 therebetween; and the first variable lens group 10 and the second variable lens group 20 move towards the object side based on the positions thereof which are determined at the first intermediate focal length fm1, after the first through fourth lens groups L1 through L4 have been moved towards the image side, while changing the distance therebetween.

[D] At the second intermediate focal length fm2, the first variable lens group 10 and the second variable lens group 20 are moved towards the image side at the long focal length extremity of the intermediate zooming range Zm; and the first sub-lens group S1 moves to the image-side movement extremity of the guide groove 13, and wherein the first sub-lens group S1 moves toward the second sub-lens group S2 so that the distance therebetween is determined by a shorter distance (second separation space/narrow space) d2.

[E] In a long-focal-length zooming range Zt from the second intermediate focal length fm2 to the long focal length extremity ft, the first sub-lens group S1 and the second sub-lens group S2 maintain the shorter distance d2 therebetween, and the third sub-lens group S3 and the fourth sub-lens group S4 maintain the shorter distance d4 therebetween; and the first variable lens group 10 and the second variable lens group 20 move towards the object side based on the positions thereof which are determined at the second intermediate focal length fm2, after the first through fourth lens groups L1 through L4 have been moved towards the image side, while changing the distance therebetween.

The zoom paths for the first variable lens group 10 and the second variable lens group 20 are simply depicted as straight lines in FIG. 6. It should be noted, however, that the actual zoom paths are not necessarily straight lines.

Focusing is performed by integrally moving, in the optical axis direction, the first sub-lens group S1 and the second sub-lens group S2, i.e., the first variable lens group 10 (first lens group frame 11) regardless of the zooming range.

Similar to the first through fifth embodiments, in the sixth embodiment, the -zoom paths are discontinuous at the first intermediate focal length fm1 and the second intermediate focal length fm2; however, a solution for continuously forming a correct image plane exists by appropriately determining the positions of the first sub-lens group S1 (first lens group L1), the second sub-lens group S2 (second lens group L2), the third sub-lens group S3 (third lens group L3), and the fourth sub-lens group S4 (fourth lens group L4), respectively, at the short focal length extremity fw, the first and second intermediate focal lengths fm1, fm2 (discontinuous line), and the long focal length extremity ft.

According to such a zoom path, a miniaturized zoom lens system having a high zoom ratio can be obtained.

Figure 7:
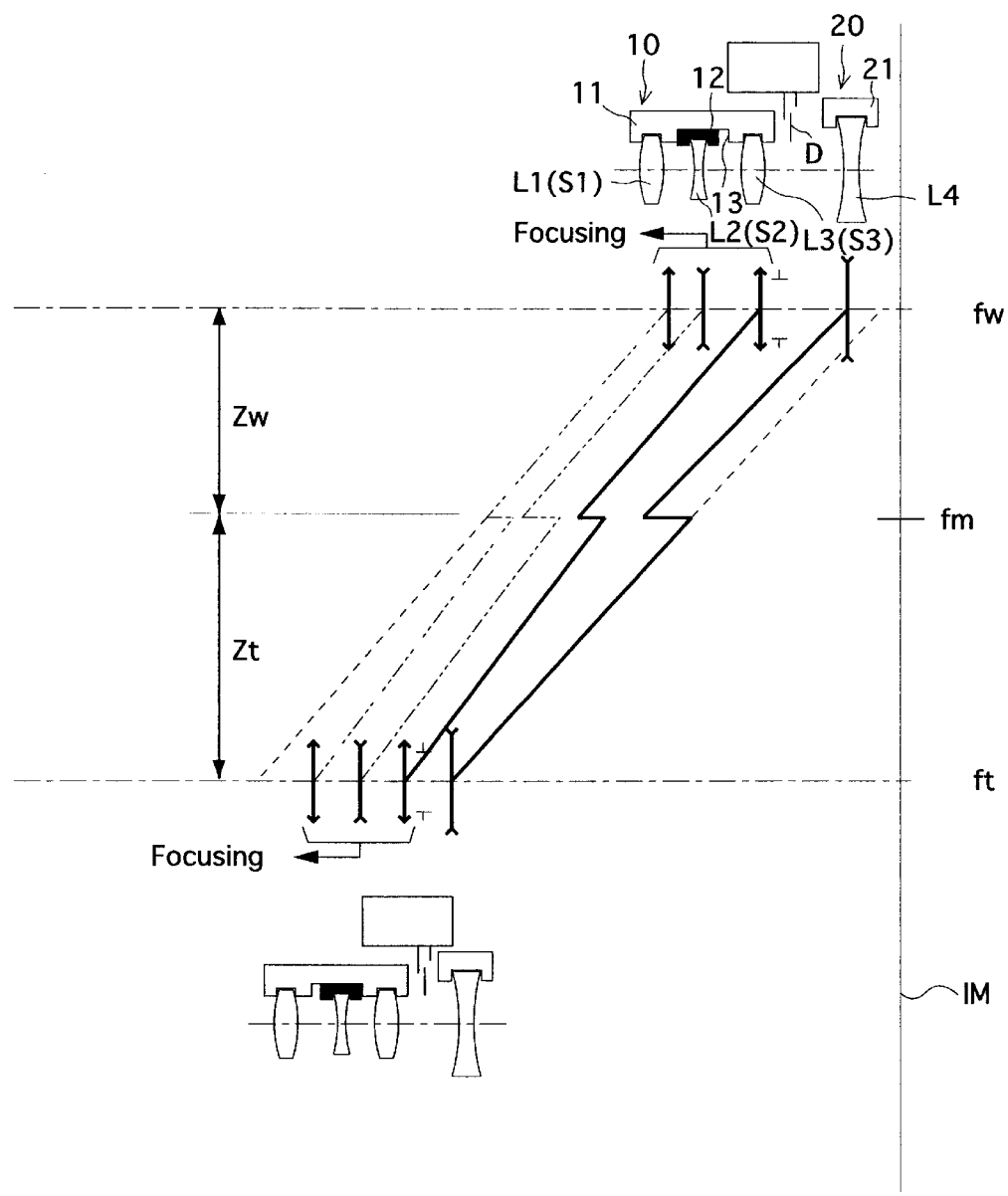
FIG. 7 is a schematic drawing of a seventh embodiment of a zoom lens system having switching lens groups and the fundamental zoom path thereof, to which the present invention is applied.

FIG. 7 shows the seventh embodiment of the zoom lens system with a switching lens group. The zoom lens system includes a positive first variable lens group 10, and a negative second variable lens group 20, in that order from the object side. The first variable lens group 10 includes a positive first lens group L1 (first sub-lens group S1), a negative second lens group L2 (second sub-lens group S2) and a positive third lens group L3 (third sub-lens group S3), in that order from the object side. The second variable lens group 20 includes a negative fourth lens group L4. The first sub-lens group S1 and the third sub-lens group S3 are fixed to a first lens group frame 11. The second sub-lens group S2 is mounted on a movable sub-lens group frame 12. The movable sub-lens group frame 12 is arranged to move in the optical axis direction, by a predetermined distance, along a guide groove 13 which is formed on the first lens group frame 11. The second sub-lens group S2 is selectively moved to either the object-side movement extremity at which the movable sub lens group frame 12 comes into contact with the front end of the guide groove 13, or the image-side movement extremity at which the movable sub-lens group frame 12 comes into contact with the rear end of the guide groove 13. The fourth lens group L4 of the second variable lens group 20 is fixed to a second lens group frame 21. A diaphragm D is arranged to move together with the first variable lens group 10 (first lens group frame 11).

In the zoom paths according to the seventh embodiment, the first variable lens group 10 (first lens group frame 11), the second variable lens group 20 (second lens group frame 21), and the second sub-lens group S2 move in the following manner:

[A] In a short-focal-length zooming range Zw from the short focal length extremity fw to an intermediate focal length fm, the first sub-lens group S1 and the second sub-lens group S2 maintain a shorter distance therebetween; however, the second sub-lens group S2 and the third sub-lens group S3 maintain a longer distance therebetween; and the first variable lens group 10 (first lens group frame 11) and the second variable lens group 20 (second lens group frame 21) move towards the object side while changing the distance therebetween.

[B] At the intermediate focal length fm, the first variable lens group 10 and the second variable lens group 20 are moved towards the image side at the long focal-length extremity of the short-focal-length zooming range Zw; and the second sub-lens group S2 moves to the image-side movement extremity of the guide groove 13, and wherein the second sub-lens group S2 moves away from the first sub-lens group S1 and moves toward the third sub-lens group S3.

[C] In a long-focal-length zooming range Zt from the intermediate focal length fm to the long focal length extremity ft, the first sub-lens group S1 and the second sub-lens group S2 maintain the longer distance therebetween, and the second sub-lens group S2 and the third sub-lens group S3 maintain the shorter distance therebetween; and the first variable lens group 10 and the second variable lens group 20 move towards the object side based on the positions thereof which are determined at the intermediate focal length fm, after the first through fourth lens groups L1 through L4 have been moving towards the image side, while changing the distance therebetween.

The zoom paths for the first variable lens group 10 and the second variable lens group 20 are simply depicted as straight lines in FIG. 7. It should be noted, however, that the actual zoom paths are not necessarily straight lines.

Focusing is performed by integrally moving, in the optical axis direction, the first sub-lens group S1 through the third sub-lens group S3, i.e., the first variable lens group 10 (first lens group frame 11) regardless of the zooming range.

Similar to the first through sixth embodiments, in the seventh embodiment, the zoom paths are discontinuous at the intermediate focal length fm; however, a solution for continuously forming a correct image plane exists by appropriately determining the positions of the first sub-lens group S1 (first lens group L1), the second sub-lens group S2 (second lens group L2), the third sub-lens group S3 (third lens group L3), and the fourth lens group L4, respectively, at the short focal length extremity fw, the intermediate focal length fm, (discontinuous line), and the long focal length extremity ft. According to such a zoom path, a miniaturized zoom lens system having a high zoom ratio can be obtained.

Figure 8:
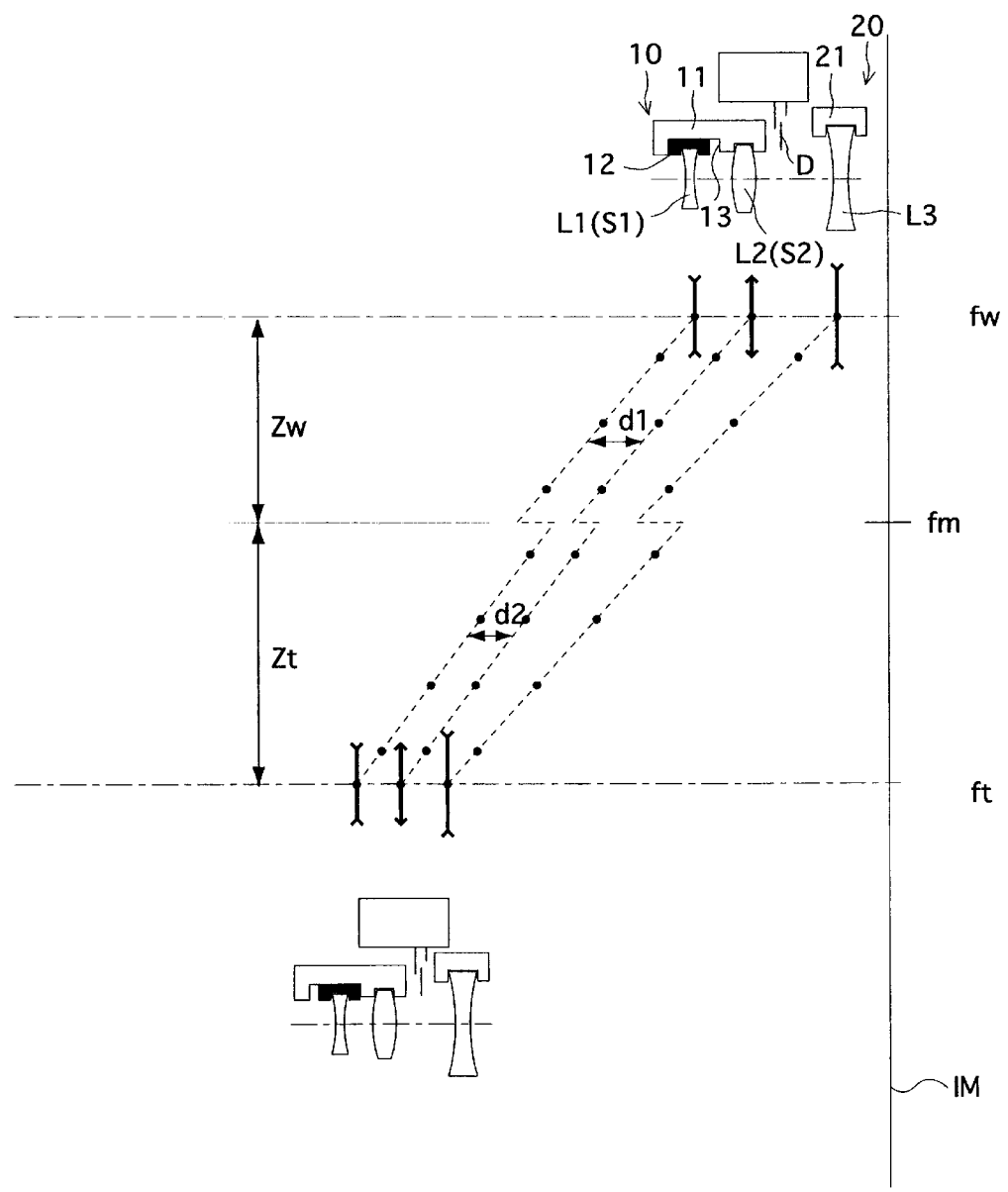
FIG. 8 shows one example of stopping positions of the lens groups when a photographic operation is carried out, to which the present invention is applied.
Figure 9A:
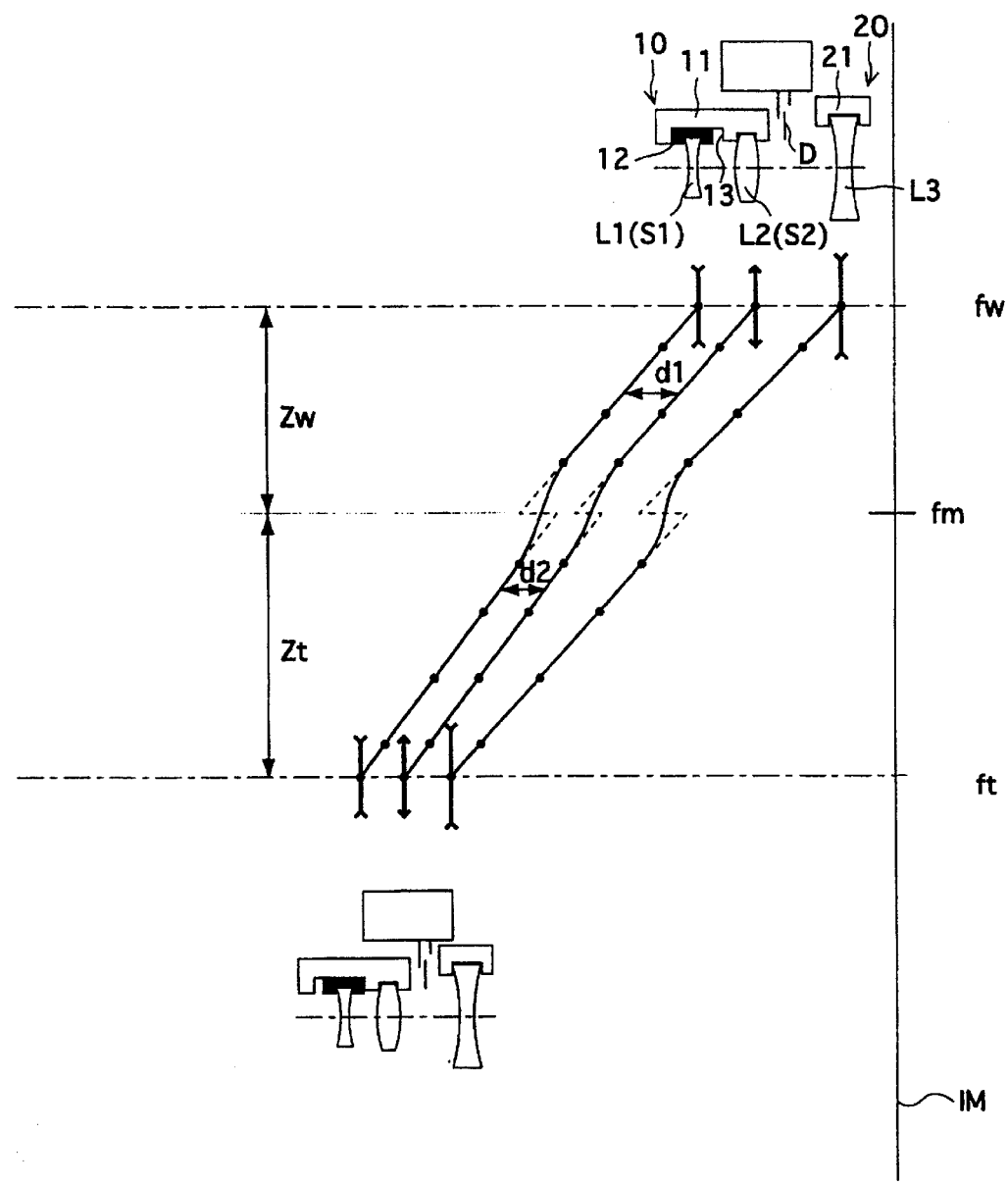
FIG. 9A shows an example of the stopping positions of FIG. 8 and an example of an actual zoom path of the lens groups, to which the present invention is applied.

As can be understood from the above description, it is practical to apply the above-described zoom lens system having switching lens groups to a photographing lens system of a camera in which the photographing lens system and a finder optical system are independently provided. Moreover, with respect to each of the first through fourth lens groups L1 through L4, stopping positions at which the lens group stops upon zooming are preferably determined in a stepwise manner along a fundamental zoom path, i.e., it is preferable to provide a plurality of focal-length steps. FIGS. 8 and 9 show zoom lens systems in which positions for stopping each lens group are determined in a stepwise manner along the fundamental zoom paths. Since these zoom lens systems are the same as that of the first embodiment, identical components are provided with the same designators. The zoom paths are depicted with fundamental dotted lines; and positions at which the first lens group frame 11 and the second lens group frame 21 stop are indicated with black dots along the dotted lines. Further, in FIG. 9A, the dots are connected by smooth (continuous) curved lines to form an actual zoom path. The actual mechanical structure thereof allows the first lens group frame 11 and the second lens group frame 21 to be moved along the smooth curved lines (actual zoom path).

In the first through seventh embodiments, each lens group is illustrated as a single lens element; however, a lens group can of course include a plurality of lens elements.

Figure 9B:
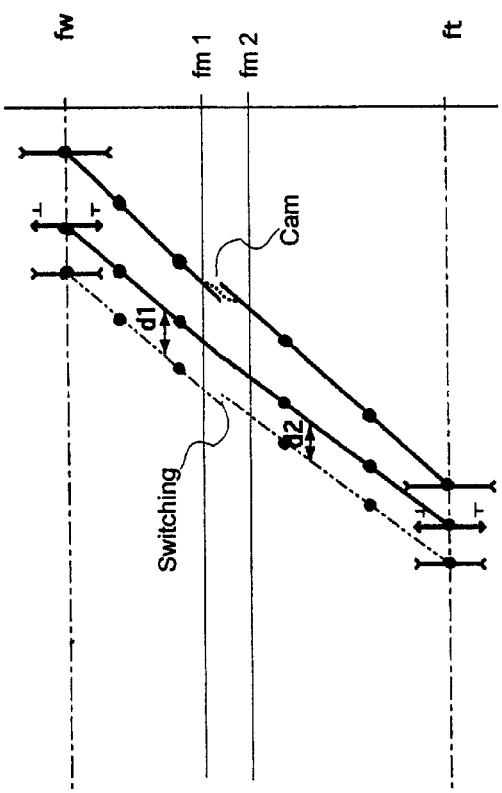
FIGS. 9B and 9C depict an additional schematic view of the concepts shown in FIGS. 8 and 9A.
Figure 9C:
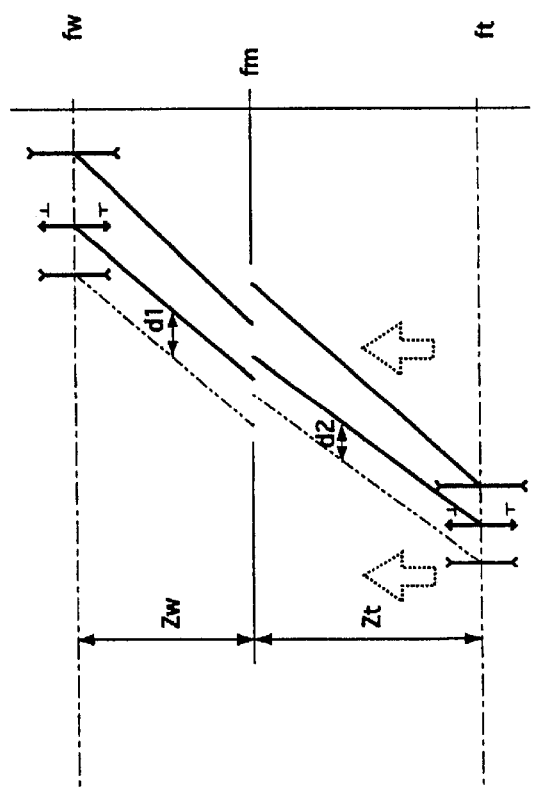

FIGS. 9B and 9C depict an additional schematic view of the concepts shown in FIGS. 8 and 9A. It should be noted in the following explanation that FIGS. 9B and 9C are schematic in nature (e.g., not to scale and/or not depicting actual shape) and that one skilled in the art will recognize that the zoom paths are not necessarily straight, and the manner in which the schematics of FIGS. 9B and 9C relate to a designed (zooming) cam groove shape (which will differ depending at least on the optical configuration). As shown in FIGS. 9B and 9C, if, in order to arrange movement in accordance with FIG. 9A, it is determined that one zoom path will be connected in an uninflected line (i.e., essentially without discontinuity or inflection and without switching), then the cam ring, shape, and orientation of cam groove(s) can be adapted for this purpose. As shown in FIG. 9B, each of the three fundamental zoom paths can include a discontinuity. By smoothly connecting one zoom path, in this case the second zoom path (e.g., depicted in the FIGS. 9B and 9C by shifting all of the zoom paths in the intermediate-to-telephoto range "up" so that the path of the second lens group is connected), it becomes possible to carry out the movements of the combined groups more simply. In this case, it is decided to use "switching" for the first group and a smooth inflection in the second group. As noted, the stepwise movement/positioning and prohibition of photography in the switching/inflection range also form part of this system.

Although FIG. 9C depicts a shift in which the second zoom path is made essentially connected, the amount of shifting "up" does not need to fully align the curve to be made smoother, but need only take up a portion of the discontinuity (e.g., reducing any inflection to a selected amount, such as an imperceptible amount). In the following description, it is noted that cam groove 44f is essentially without discontinuity or inflection, relating to the second group zoom path in FIGS. 9A–9C, and that cam groove 44r has a small inflection, relating to the third group zoom path in FIGS. 9A–9C. However, the adaptation depicted in FIGS. 9B and 9C can be used for any of the systems depicted in FIGS. 1–7 or variations thereof.

It can be decided to use at least one smooth or uninflected line for various reasons, including simplicity of movement, simplicity of manufacturing, or to improve exterior appearance of movement of lens barrels (e.g., to avoid visible discontinuity in the operation of the lens barrels, so that an unsophisticated operator does not become concerned about the proper operation of the camera). In the example given, the movement of the lens barrel supporting the second lens group is essentially continuous, while the switching movement of the first lens group and the inflected movement of the third lens group cannot be seen from the exterior of the camera.

In each of the above-described embodiments, the first variable lens group 10 in FIGS. 1, 8, and 9A–9C, the second variable lens group 20 in FIG. 2, the second variable lens group 20 in FIG. 3, the first variable lens group 10 in FIG. 4, the first variable lens group 10 in FIG. 5, the first variable lens group 10 in FIG. 6, and the first variable lens group 10 in FIG. 7 (including the first lens L1 and the third lens L3 as a unit) are each switching lens groups which serve as focusing lens groups in any focal length range.

A preferred embodiment will now be described in which the present invention has been applied to the zoom lens barrel in the examples shown in FIGS. 1, 8, and 9A–9C, which have a first variable lens group 10 (switching lens group) and a second variable lens group 20.

FIGS. 10 through 31 show an embodiment of a zoom lens barrel (system). Unlike the zoom lens systems shown in FIGS. 1, 8 and 9, in which one of the first and second sub-lens groups S1 and S2, which together form a switching lens group 10, is fixed to the first lens group frame 11, the first and second sub-lens groups S1 and S2 in this embodiment are both movable with respect to the switching lens group frame in the optical axis direction. In this embodiment, a moving path of the switching lens group frame upon zooming and a path of the first sub-lens group S1 and the second sub-lens group S2 within the switching lens group frame can be added to each other to give a composite zoom path, which corresponds to the zoom path shown in FIGS. 1, 8, and 9A–9C. Upon focusing, the first sub-lens group S1 and the second sub-lens group S2 are integrally moved within the switching lens frame in the optical axis direction. In a photographic operation, the first sub-lens group S1 and the second sub-lens group S2 are placed at a predetermined position, before the release of the shutter is started, as a result of the movement of the switching lens group frame and the movement of the first sub-lens group S1 and the second sub-lens group S2 within the switching lens group frame in accordance with focal length information set by an operator (the photographer) and object distance information detected.

As shown in FIG. 10, a stationary barrel 42, which is fixed to a camera body 41, has a female helicoid 43 formed on an inner surface of the stationary barrel 42. A male helicoid 45, which is formed on the rearmost circumference of a cam ring 44, engages with the female helicoid 43. Arranged outside of the stationary barrel 42 is a pinion 47 which is rotated by a zooming motor 46. Gear teeth (not shown) are formed on the circumference of the cam ring 44 wherein a part of the male helicoid 45 is cut out therefor. The gear teeth, which are formed to have the same oblique direction as the lead of the male helicoid 45, engages with the pinion 47. Accordingly, the cam ring 44 advances or retreats along the optical axis direction when the cam ring 44 is rotated in either direction by the zooming motor 46 due to the engagement of the female helicoid 43 and male helicoid 45. The position of the cam ring 44 resulting from the rotation made by the zooming motor 46 is detected by focal length detecting device 46C, which can include, for example, of a code plate and a brush.

A linear guide ring 48 is supported by the cam ring 44. The guide ring 48 rotates relative to the cam ring 44 and moves together with the cam ring 44 along the optical axis direction (i.e., no relative displacement is allowed in the optical axis direction). The guide ring 48 is supported by a camera body 41 in a manner that enables the guide ring 48 to move only in the optical axis direction. Arranged inside of the cam ring 44 in order from the front side of the cam ring 44 are a switching lens group frame 50 (first lens group frame) which supports the first variable lens group 10 (i.e., the first sub-lens group S1 and second sub-lens group S2) and a second lens group frame 49 which supports the second variable lens group 20. The switching lens group frame 50 and the second lens group frame 49 are linearly guided along the optical axis direction by the guide ring 48.

Figure 11:
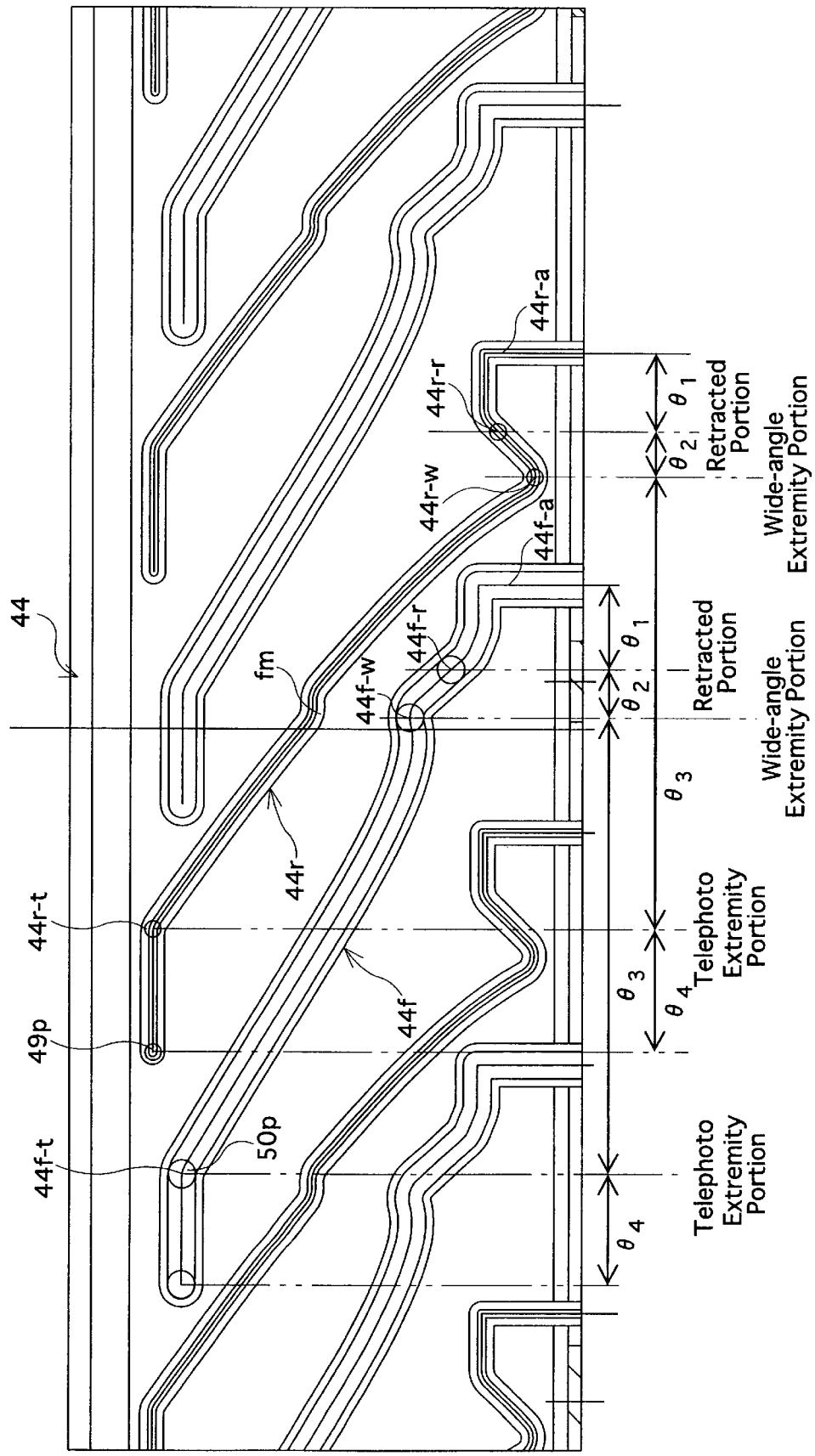
FIG. 11 is a developed view of an inner surface of a cam ring of the zoom lens barrel of FIG. 10 showing an exemplary arrangement of cam grooves.

Cam grooves 44f and 44r are formed on an inner surface of the cam ring 44. The cam grooves 44f and 44r receive the switching lens group frame 50 and second lens group frame 49, respectively. FIG. 11 shows an arrangement of the cam grooves 44f and 44r in a developed view. Three sets of the cam grooves 44f and 44r are formed circumferentially with each groove spaced at equi-angular distances from one another. Radial follower pins 50p and 49p are provided on the switching lens group frame 50 and the second lens group frame 49 to be received in the cam grooves 44f and 44r, respectively.

The cam grooves 44f and 44r include introducing portions 44f-a and 44r-a for the follower pins 50p and 49p, retracted portions 44f-r and 44r-r for the zoom lens system, wide-angle extremity portions 44f-w and 44r-w, and telephoto extremity portions 44f-t and 44r-t, respectively. A rotational angle $\theta_1$ is defined as the rotational angle from the introducing portions 44f-a and 44r-a to the retracted portions 44f-r and 44r-r, respectively. A rotational angle $\theta_2$ is defined as the rotational angle from the retracted portions 44f-r and 44r-r to the wide-angle extremity portions 44f-w and 44r-w, respectively. A rotational angle $\theta_3$ is defined as the rotational angle from the wide-angle extremity portions 44f-w and 44r-w to the telephoto extremity portions 44f-t and 44r-t, respectively. A rotational angle $\theta_4$, defined as the rotational angle beyond the telephoto extremity portions 44f-t and 44r-t, which serves as a rotational angle for assembly use. Each of the cam grooves 44r for the second lens group frame 49 has an intermediate discontinuous position fm that corresponds to the zoom path of the second variable lens group 20 as described in the embodiments in FIGS. 1, 8 and 9.

In contrast, no discontinuous position appears to exist in the cam grooves 44f for the first variable lens group 10 between the wide-angle extremity portion 44f-w and the telephoto extremity portion 44f-t since the change in shape (profile) of each cam groove 44f is smooth in this area. This is because, in this embodiment, the switching lens group frame 50 and the sub-lens group S2 are moved in such a manner that the positions of the sub-lens group S2 are not discontinuous in the short-focal-length zooming range Zw and in the long-focal-length zooming range Zt, the two ranges extending on both sides of intermediate focal length fm in FIG. 1. A connection line CC is schematically shown in FIG. 1. The connection line CC connects the zoom path of the short-focal-length zooming range Zw to zoom path of the long-focal-length zooming range Zt, the two ranges extending on both sides of the intermediate focal length fm. The cam groove 44f is shaped to correspond to the zoom path connected by the connection line CC. As the follower pin 50p moves along a section corresponding to the connection line CC, the sub-lens group S1 moves from the object-side movement extremity to the image-side movement extremity. It is necessary to control the zoom lens barrel so that the section of the cam groove 44f corresponding to the line CC is not used as an actual zooming range in a photographic operation (i.e., the cam ring 44 is not stopped) Alternatively, the cam grove 44f can include the discontinuous position similar to that of the cam groove 44r.

In the above-described zoom lens barrel, the cam ring 44 advances or retreats along the optical axis while rotating as the pinion 47 is rotated via the zooming motor 46 in either direction, which causes the switching lens group frame 50 (i.e., the first variable lens group 10) and the second lens group frame 49 (i.e., the second variable lens group 20), which are guided in the optical axis direction within the cam ring 44, to move in the optical axis direction along a predetermined path defined by the cam grooves 44f and 44r.

Novel features of the present embodiment reside in a support structure by which the first sub-lens group S1 and the second sub-lens group S2 are supported in the switching lens group frame 50 and the driving structure thereof. A particular example of an arrangement within the switching lens group frame 50 will now be described by reference to FIGS. 12 through 31.

Figure 15:
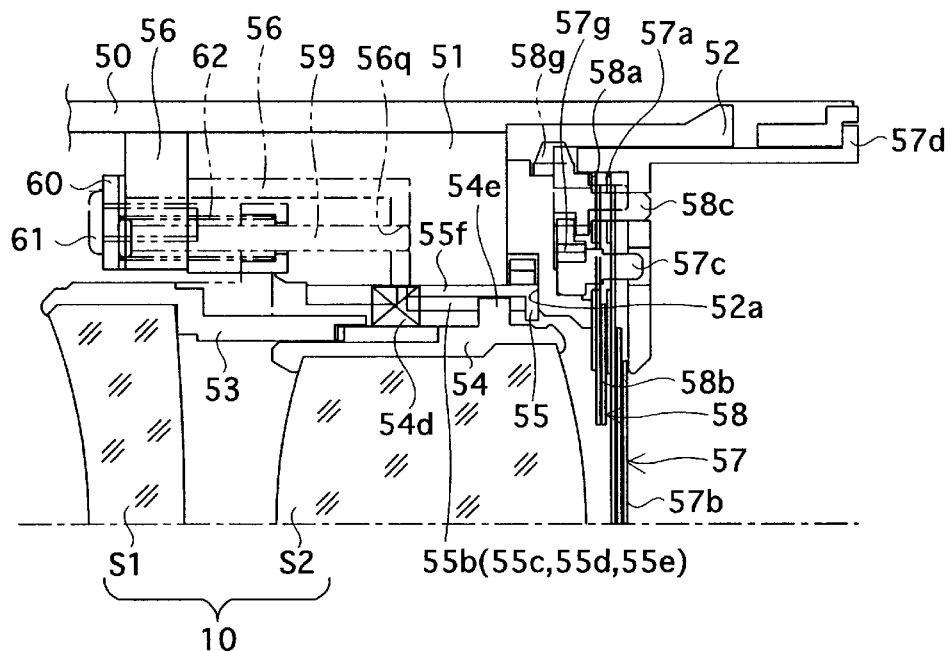
FIG. 15 is a cross-sectional view of an upper half of the switching lens group in which a first sub-lens group and a second sub-lens group are in a mutually distant position at the wide-angle extremity.
Figure 16:
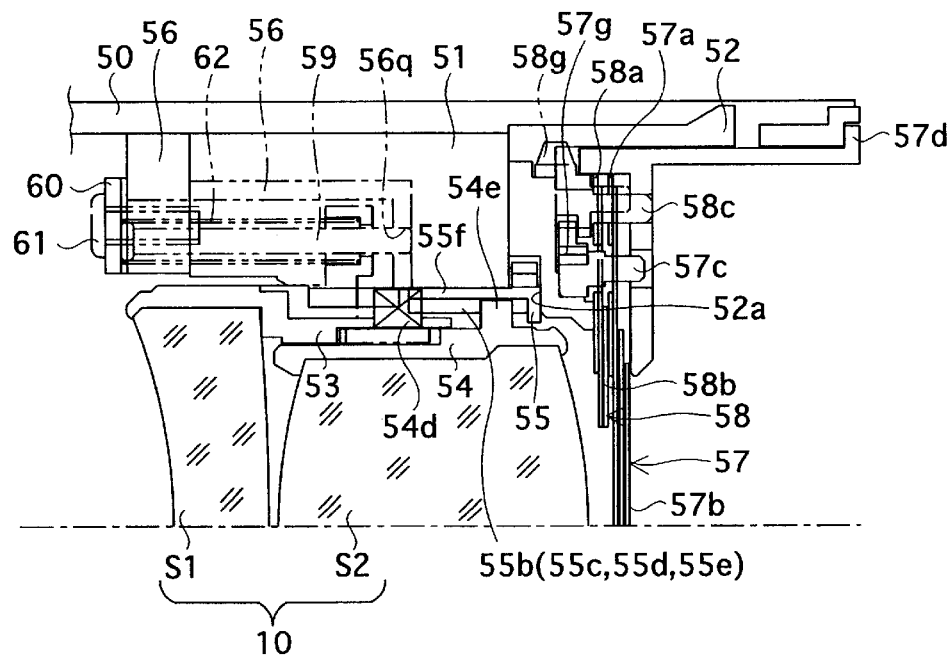
FIG. 16 is a cross-sectional view of an upper half of the switching lens group in which the first sub-lens group and the second sub-lens group are in a mutually close position at the telephoto extremity.

As shown in FIGS. 15 and 16, a front shutter retaining ring 51, a rear shutter retaining ring 52, a first sub-lens group frame 53, a second sub-lens group frame 54, an actuator ring 55, and a gear holding ring 56 are arranged within the switching lens group frame 50. The front shutter retaining ring 51, the rear shutter retaining ring 52, and the gear holding ring 56 form a portion of the switching lens group frame 50. The first sub-lens group S1 is fixed to the first sub-lens group frame 53, and the second sub-lens group S2 is fixed to the second sub-lens group frame 54. The first sub-lens group frame 53, the second sub-lens group frame 54, and the actuator ring 55 are movably fitted in a central opening 51p (see FIG. 12) of the front shutter retaining ring 51. These movable members, i.e., the first sub-lens group frame 53, the second sub-lens group frame 54, and the actuator ring 55, enable the first sub-lens group S1 and the second sub-lens group S2 to be at a mutually close position, or be at a mutually distant position, with respect to the optical axis direction, and also enable the first sub-lens group S1 and the second sub-lens group S2 to perform focusing.

Figure 12:
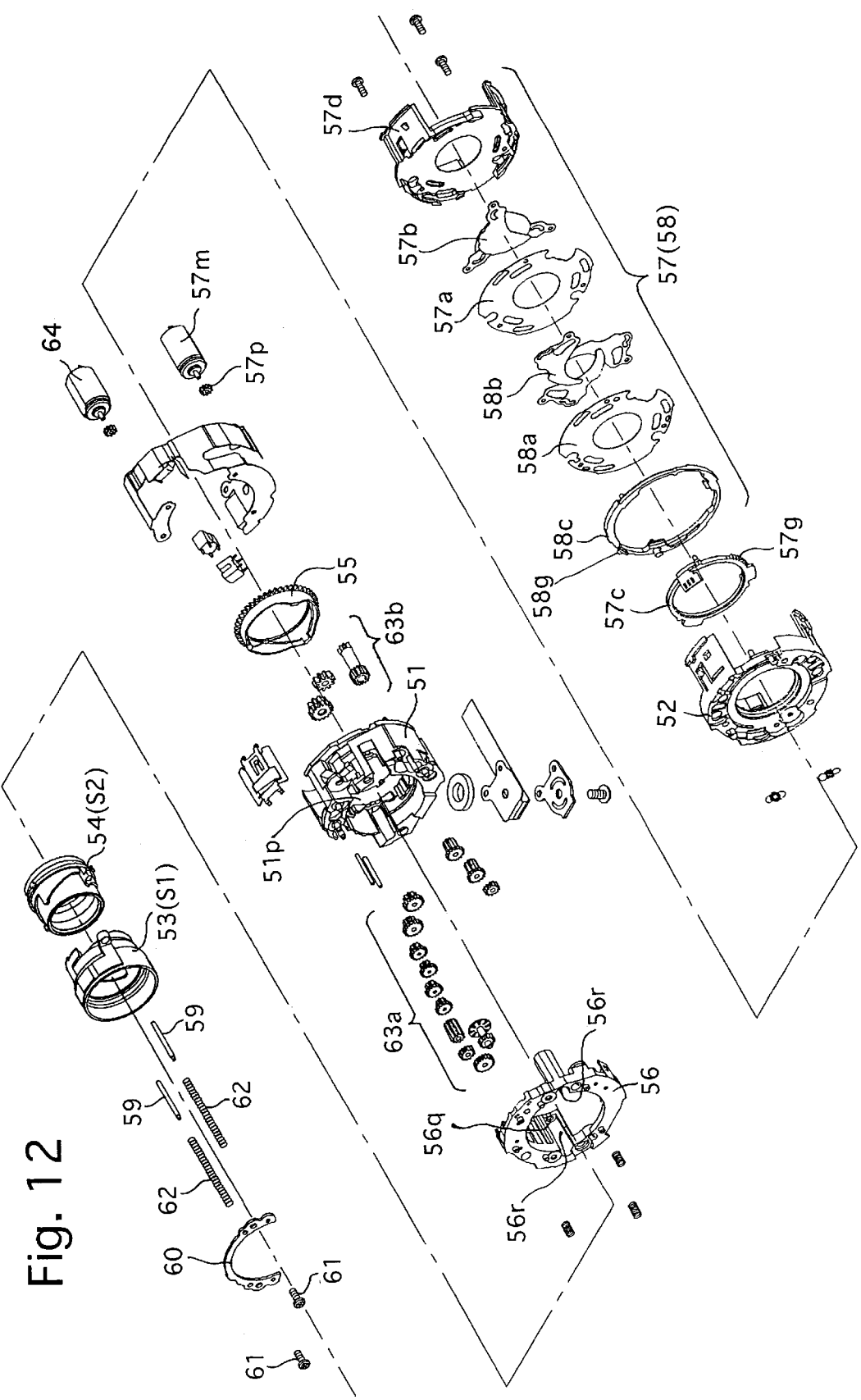
FIG. 12 is an exploded perspective view showing components of a switching lens group frame of the zoom lens barrel.
Figure 13:
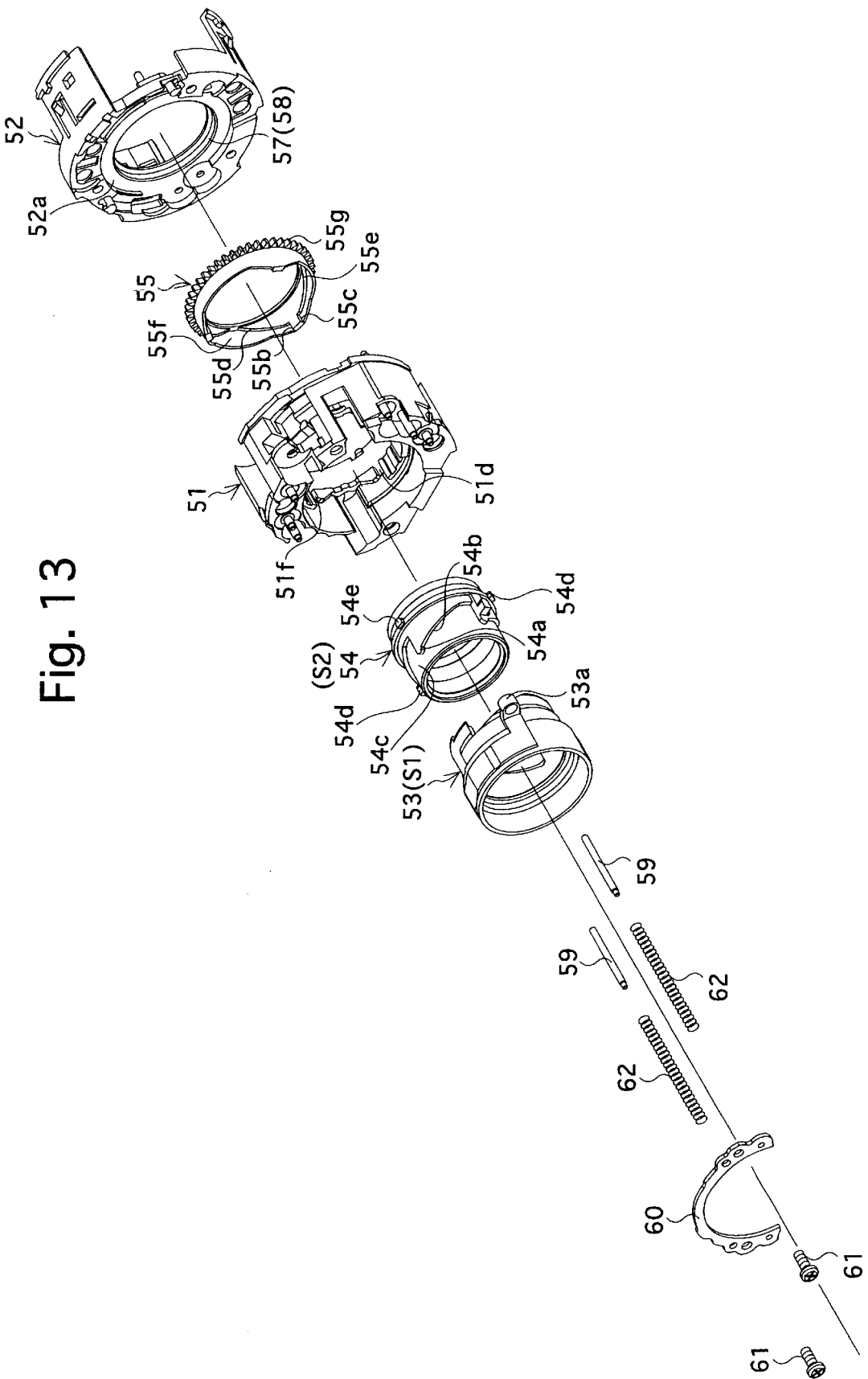
FIG. 13 is an exploded perspective view showing some of the components of the switching lens group frame of the zoom lens barrel.
Figure 14:
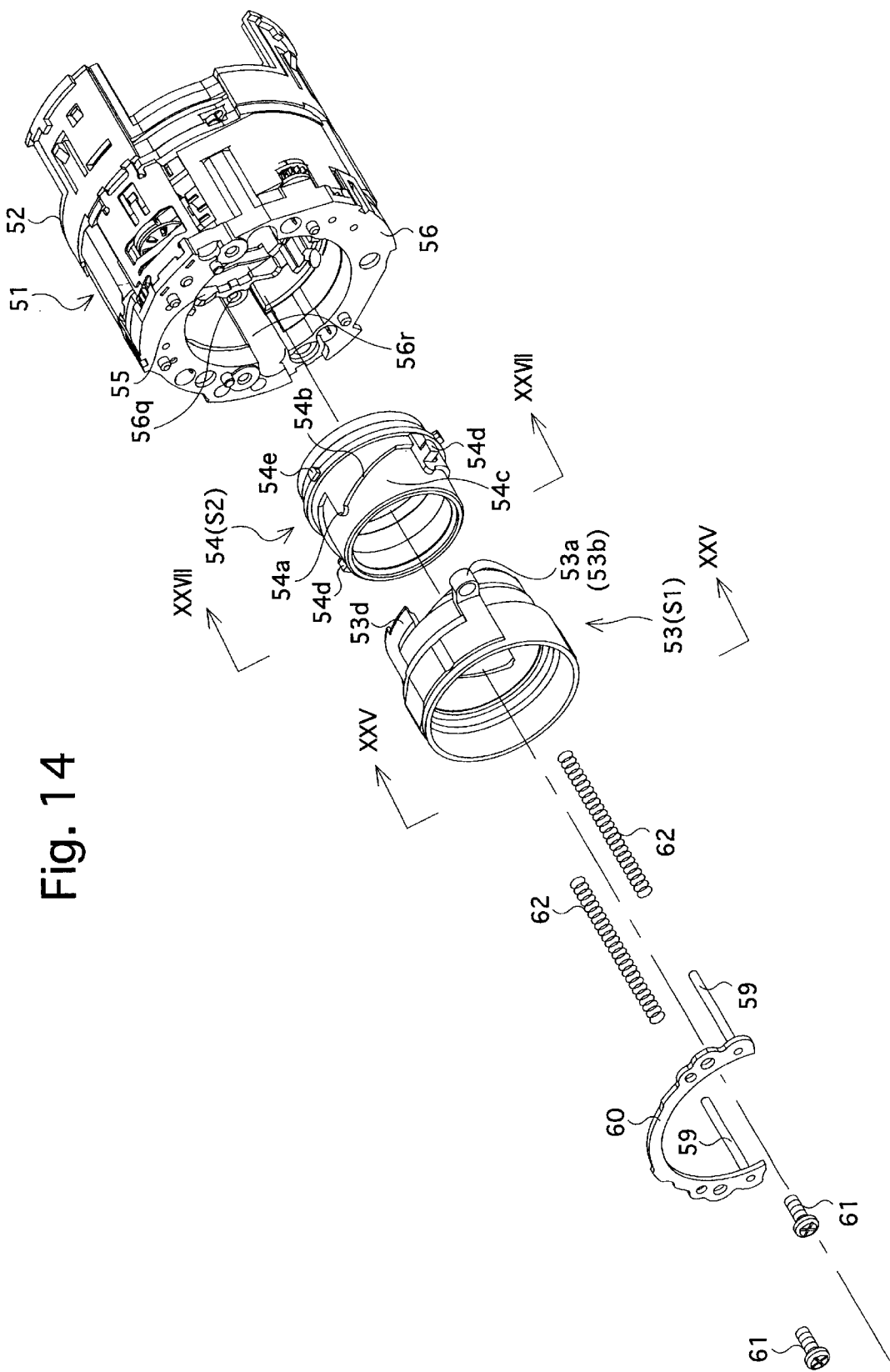
FIG. 14 is a perspective view showing a different assembly of some of the components of the switching lens group frame of the zoom lens barrel.

The actuator ring 55 is rotatably supported between the front and rear shutter retaining rings 51 and 52 with the rearmost portion of the actuator ring 55 being restricted by a receiving surface 52a (FIGS. 13, 15, and 16) of the rear shutter retaining ring 52. The actuator ring 55 is a driving member that enables the first sub-lens group S1 and the second sub-lens group S2 to become mutually close or mutually distant from each other, and enables the first and the second sub-lens groups S1 and S2 to perform focusing via the rotation thereof. The gear holding ring 56 is fixed to the front end of the front shutter retaining ring 51, and a lens shutter mechanism 57 and a diaphragm mechanism 58 are supported by the rear shutter retaining ring 52 (FIGS. 12, 15, and 16).

The first sub-lens group frame 53 has a cylindrical shape and has two linear guide ribs 53a on its periphery at the opposite sides thereof at an equi-angular interval of 180 degrees. A guide bore 53b is formed in the guide rib 53a. A guide rod 59 is loosely inserted (or moveably fitted) in the guide bore 53b. The rear end of the guide rod 59 is fixed in a fixing bore 56q formed at the rearmost portion of the gear holding ring 56 while the front end of the guide rod 59 is fixed to the front surface of the gear holding ring 56 by a bracket 60 and a screw 61. A coil spring 62 is placed over each of the guide rod 59 between the bracket 60 and the guide rib 53a so that the coil spring 62 biases the first sub-lens group frame 53 toward the second sub-lens group frame 54. A U-shaped recess 56r is provided on the gear holding ring 56 so as to receive the guide rod 59 and the spring 62 (FIGS. 25 through 27). The recess 56r communicatively connects with the central opening 51p of the front shutter retaining ring 51. The first sub-lens group frame 53 can be connected to the front shutter retaining ring 51 by engaging the guide ribs 53a with the guide rods 59 of the front shutter retaining ring 51 at two positions, wherein the guide ribs 53a are provided on the first sub-lens group frame 53 at 180° intervals about the optical axis.

As shown in FIGS. 17A, 18A, 19A and 20A, the first sub-lens group frame 53 is provided with four shift leading surfaces (shift cam surfaces) 53c that are formed circumferentially at equi-angular intervals on the end-face of the first sub-lens group frame 53. Annular light-blocking support ribs 53d (see FIG. 14) are provided radially outside of the shift leading surfaces 53c over the open ends of the shift leading surfaces 53c. FIG. 23 shows an enlarged expanded view of one of the shift leading surfaces 53c which is formed essentially as a straight slope having an inclination angle α with respect to a circumferential edge of the first sub-lens group 53 (i.e., with respect to a plane normal to the optical axis), and is provided with a pair of follower engaging recesses 53e and 53f on either end of the shift leading surface 53c. Each of the engaging recesses 53e and 53f is formed as a shallow V-shaped recess. The follower engaging recess 53e defines a mutually distant position on the wide-angle side and the follower engaging recess 53f defines a mutually close position on the telephoto side, of the first sub-lens group frame 53 and the second sub-lens group frame 54 (i.e., the first sub-lens group S1 and second sub-lens group S2).

As shown in FIGS. 17A, 18A, 19A and 20A, the second sub-lens group frame 54 is provided on its periphery with four follower projections 54a, each corresponding to each of the four shift leading surfaces 53c of the first sub-lens group frame 53. An inclined surface 54b is provided so as to correspond to the shift leading surface 53c of the first sub-lens group frame 53, and the follower projection 54a is provided on the end of the inclined surface 54b which is the closest to the shift leading surface 53c. The tip of the follower projection 54a has a substantially semi-circular shape which is symmetrical with respect to the longitudinal axis thereof, so that the shapes of the engaging recesses 53e and 53f correspond to the tip shape of the projection 54a. Annular light-blocking support ribs 54c are radially provided on the second sub-lens group frame 54 inside the projections 54a and the inclined surfaces 54b. The shift leading surfaces 53c formed on the first sub-lens group frame 53 and the follower projections 54a formed on the second sub-lens group frame 54 together form a shift cam mechanism (of a lens group shift mechanism) that enables the lens-group frames 53 and 54 either be at a mutually close position, or be at a mutually distant position. As described above, the four shift leading surfaces 53c of the first sub-lens group frame 53 and the four projections 54a of the second sub-lens group frame 54 are spaced at equi-angular intervals. Accordingly, each of the surfaces can engage with its respective projection at 180° intervals of a relative rotation. Given that N is the number of the shift leading surfaces 53c or the follower projections 54a (four, in this embodiment) and that M is the number of the guide ribs 53a of the first sub-lens group frame 53 or the number of the guide rods 59 of the front shutter retaining ring 51 (two, in this embodiment), the relationship between M and N is that M is a multiple of N, or in other words, N is a divisor of M. This relationship makes it possible to select an assembly position from among different assembly positions, so that for example, an assembly position that provides optimum optical performance can be achieved.

Furthermore, a pair of linear guide projections 54d are formed on the second sub-lens group frame 54 on the outer surface thereof. The guide projections 54d are formed at the same circumferential positions as two of the four follower projections 54a that are positioned on the periphery of the second sub-lens group frame 54 at the opposite sides thereof at an equi-angular interval of 180 degrees. Each of the guide projections 54d is formed at a position which is rearward with respect to the follower projection 54a in the optical axis direction. Also formed on the second sub-lens group frame 54 on the outer surface thereof are three lugs 54e, which are spaced at equi-angular intervals, and are positioned rearward with respect to the guide projection 54d in the optical axis direction. As best shown in FIG. 24, each lug 54e has a pair of contact surfaces N1 and N2 that are spaced apart from each other in a circumferential direction. Each lug 54e also has a smooth circular shaped end surface N3 that is symmetrical with respect to the central axis of the lug 54e extending in the middle of the contact surfaces N1 and N2.

As shown in FIG. 24, a pair of rotation preventing surfaces 51 a and 51 b are formed on the front shutter retaining ring 51 on the inner surface thereof, in order to define the range of rotation of the second sub-lens group frame 54 relative to the non-rotating front shutter retaining ring 51, with respect to the guide projection 54d of the second sub-lens group frame 54. The rotation preventing surfaces 51a and 51b come into contact with contact surfaces M1 and M2 of the guide projection 54d, respectively, when the second sub-lens group frame 54 is rotated in either direction, thereby defining the rotational movement extremities of the second sub-lens group frame 54. A wide-angle linear guide slot 51d is defined between the rotation preventing surface 51a and a guide surface 51c which comes into contact with the contact surface M2 of the guide projection 54d. A telephoto linear guide slot 51f is defined between the rotation preventing surface 51b and a guide surface 51e which comes into contact with the contact surface M1 of the guide projection 54d. Thus, the width of both of the wide-angle linear guide slot 51d and the telephoto linear guide slot 51f in the circumferential direction corresponds to that of the linear guide projection 54d in the same direction. Accordingly, the guide projection 54d snugly fit in the guide slots 51d and 51f so as to movable therein.

The clearance between the wide-angle linear guide slot 51d or the telephoto linear guide slot 51f and the guide projection 54d is determined smaller (stricter) than the clearance between the guide bore 53b of the first sub-lens group frame 53 and the guide rod 59. The linear guide projections 54d are provided on the periphery of the second sub-lens group frame 54 on opposite sides thereof at an equi-angular interval of 180 degrees. A pair of the wide-angle and telephoto linear guide slots 51d and 51f are provided on the front shutter retaining ring 51 so that two linear guide projections 54d can be selectively received in the wide-angle and telephoto linear guide slots 51d and 51f with respect to the rotational positions thereof (i.e., at an angular interval of 180 degrees).

Figure 22:
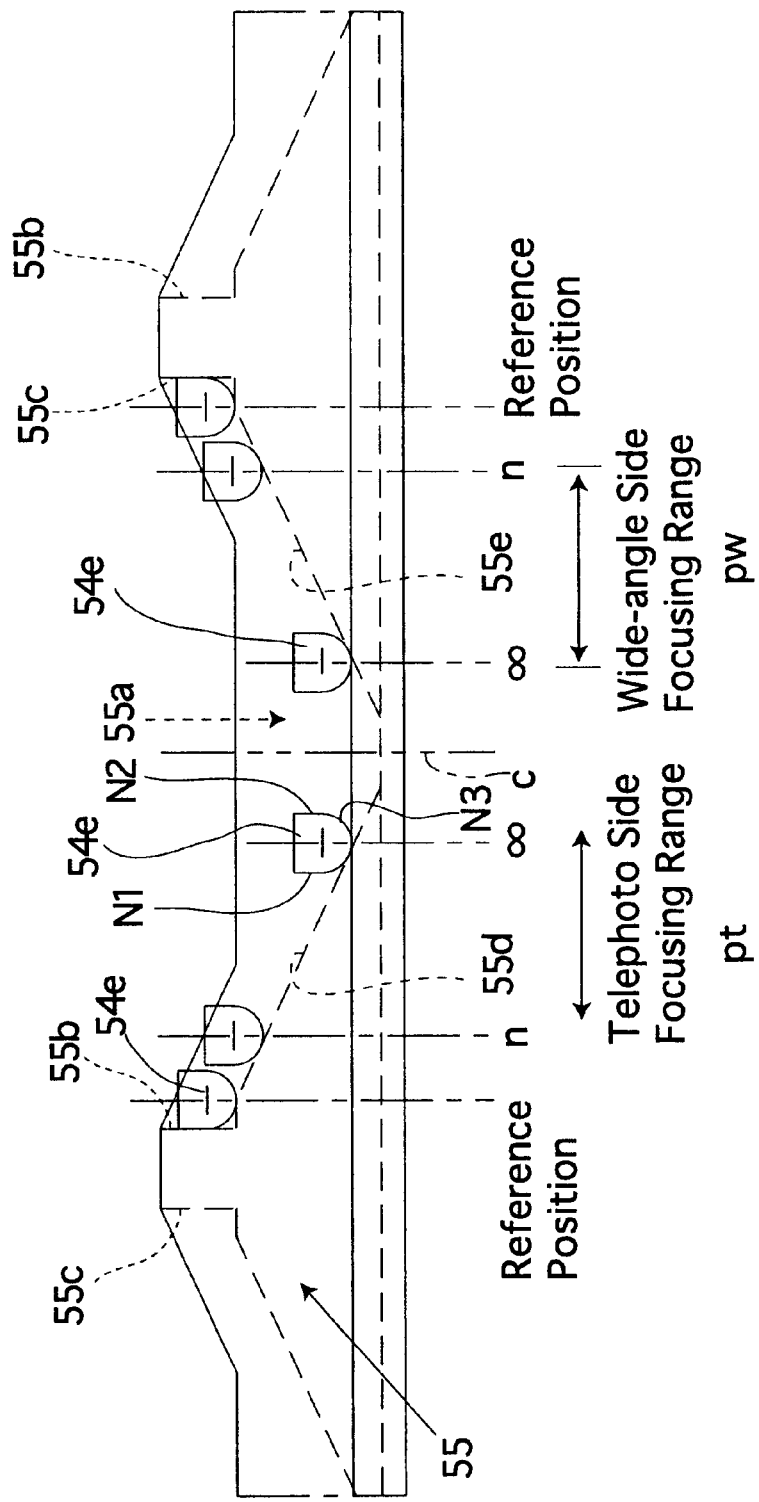
FIG. 22 illustrates how focusing is carried out by the actuator ring.

The actuator ring 55 has, on the front end surface thereof, three control recesses 55a that each correspond to each of the lugs 54e of the second sub-lens group frame 54 (see FIG. 22). Each of the control recesses 55a has a shape that is symmetrical with respect to the central axis extending parallel to the optical axis and includes a pair of effective surfaces 55b and 55c that respectively come into contact with contact surfaces N1 and N2. The lugs 54e of the second sub-lens group frame 54 and the control recesses 55a constitute a focusing cam mechanism of a focusing mechanism. The control recess 55a also includes a pair of focus leading surfaces 55d and 55e (focus cam surfaces) on the telephoto side and on the wide-angle side, respectively. The focus leading surfaces 55d and 55e each come into contact with the circular end surface N3 of the lug 54e. The telephoto-side focus leading surface 55d and the wide-angle-side focus leading surface 55e are provided between the effective surfaces 55b and 55c in the form of an end-faced cam having an open front end. The slopes of the leading surfaces 55d and 55e have opposite directions with respect to the circumferential direction thereof, but have the same absolute value, i.e., the slopes both incline forwards in the optical axis direction. Annular light-blocking support ribs 55f (see FIG. 13) are provided radially outside, and over the front portion, of the control recess 55a of the actuator ring 55. The focus leading surfaces 55d and 55e, together with the lug 54e provided on the second sub-lens group frame 54, form a focus cam mechanism. As described above, the three lugs 54e of the second sub-lens group frame 54 and the three control recesses 55a of the actuator ring 55 are spaced at equi-angular intervals. In the illustrated embodiment, each of the lugs can engage with a respective recess at 120° angular intervals.

The aforementioned coil springs 62, which bias the first sub-lens group frame 53 rearward, so that the shift leading surfaces 53c contact the follower projections 54a, and the lugs 54e of the second sub-lens group frame 54 contact the telephoto side or wide-angle side focus leading surfaces 55d or 55e of the actuator ring 55. As described above, the rear end surface of the actuator ring 55 abuts the receiving surface 52a of the rear shutter retaining ring 52. Accordingly, the first sub-lens group frame 53, the second sub-lens group frame 54, the actuator ring 55, and the rear shutter retaining ring 52 (receiving surface 52a) can be held in contact by the sole force exerted by the coil springs 62. As can be clearly seen from FIGS. 15 and 16, when the first sub-lens group frame 53, the second sub-lens group frame 54, the actuator ring 55, and the rear shutter retaining ring 52 are in engagement with each other, the front end of the second sub-lens group frame 54 is positioned inside the first sub-lens group frame 53, and the actuator ring 55 is situated on the periphery of the second sub-lens group frame 54.

Figure 21:
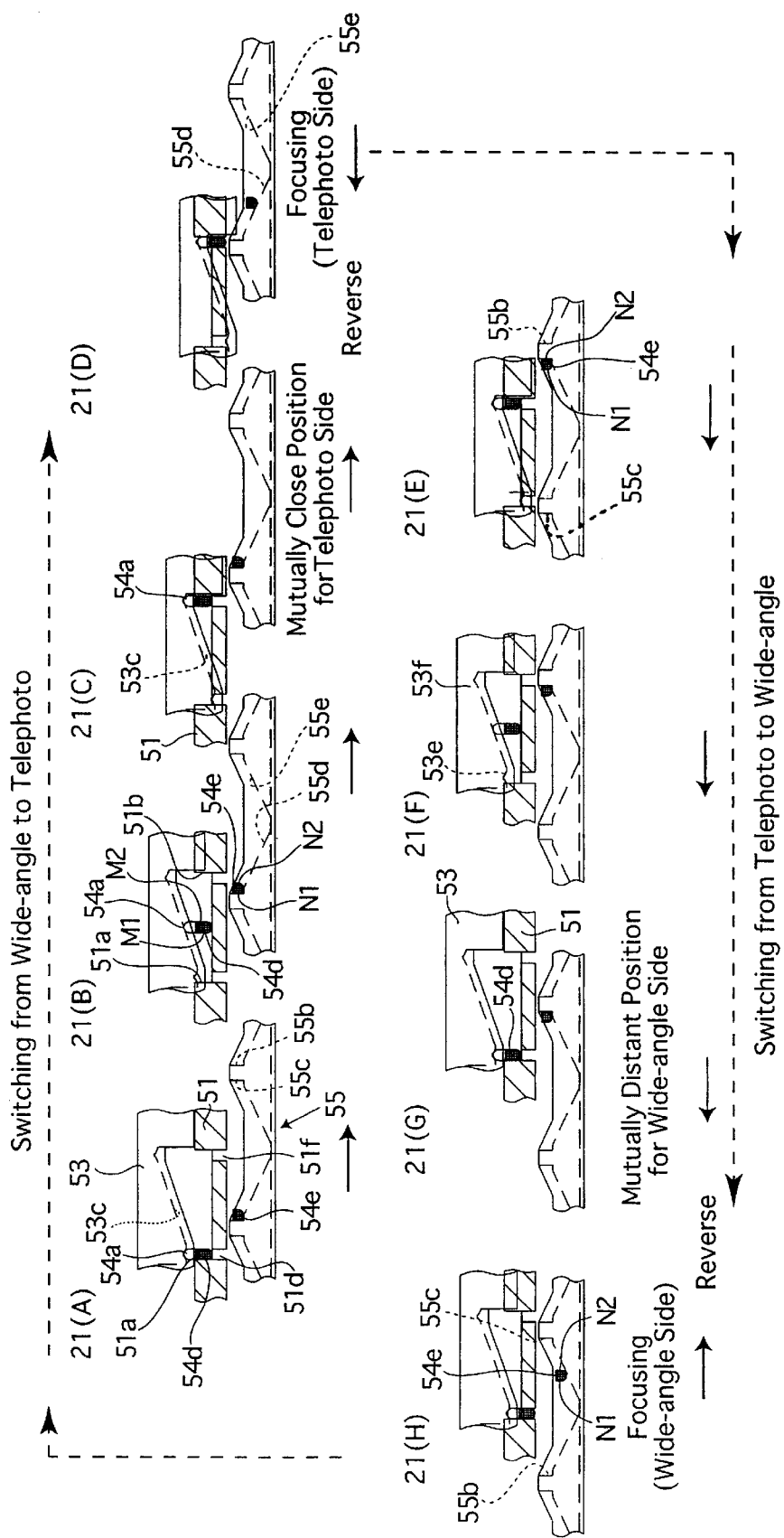
FIG. 21 is an exploded view illustrating how the mutually close position of the first sub-lens group and the second sub-lens group on the telephoto side switches to/from the mutually distant position on the wide-angle side via the rotation of an actuator ring.

FIG. 21(A through H) shows the manner in which the first sub-lens group frame 53 and the second sub-lens group frame 54 (i.e., the first sub-lens group S1 and the second sub-lens group S2) are moved via the effective surfaces 55b and 55c between a mutually close position on the telephoto side and a mutually distant position on the wide-angle side. Note that, solid line arrows represent the rotational direction of the actuator ring 55, in FIG. 21.

The arrangement shown in FIG. 21(A) is the mutually distant position on the wide-angle side, in which the effective surface 55b of the actuator ring 55 abuts the lug 54e, and the linear guide projection 54d of the second sub-lens group frame 54 is disengaged from the wide-angle linear guide slot 51d. As the actuator ring 55 rotates in a clockwise direction (i.e., moves to the right in FIG. 21), the effective surface 55b biases the contact surface N1 of the lug 54e to rotate the second sub-lens group frame 54 clockwise (to the right in FIG. 21) until the linear guide projection 54d abuts the rotation preventing surface 51b (FIGS. 21(A) through 21(C)). During the rotation of the actuator ring 55 and the second sub-lens group frame 54, the first sub-lens group frame 53 (i.e., the first sub-lens group S1) follows the shift leading surface 53c, and the follower projection 54a of the second sub-lens group frame 54 so that the first sub-lens group frame 53 linearly moves closer to the second sub-lens group frame 54 (i.e., the second sub-lens group S1) (FIG. 21(B)). Ultimately, the follower projection 54a engages with the follower engaging recess 53f and rearward movement of the first sub-lens group frame 53 with respect to the second sub-lens group frame 54 in the optical axis direction is stopped (FIG. 21(C)). Since the follower projections 54a and the follower engaging recesses 53f are spaced at equi-angular intervals therebetween, eccentricity between the first sub-lens group frame 53 and the second sub-lens group frame 54 is prevented, with all of the projections and the recesses in engagement. This completes the switching from the mutually distant position on the wide-angle side to the mutually close position on the telephoto side, resulting in the first sub-lens group S1 being in a mutually close position with respect to the second sub-lens group S2 (i.e., mutually close extremity). Note that the actuator ring 55 cannot rotate further in this direction.

Upon completion of switching to the mutually close position on the telephoto side, the rotation of the actuator ring 55 is reversed. The lug 54e (i.e., the second sub-lens group frame 54) moves rearward following the telephoto side focus leading surface 55d until the linear guide projection 54d engages with the telephoto linear guide slot 51f. This allows the linear projection 54d to move only in the optical axis direction (FIG. 21(D)). Focusing is carried out on the telephoto side from the intermediate focal length to the long focal length extremity, with the second sub-lens group frame 54 and the first sub-lens group 53 being moved integrally at the mutually close position via the telephoto side-focus leading surface 55d.

Once the actuator ring 55 is rotated until the effective surface 55c abuts the contact surface N2 of the lug 54e, the linear guide projection 54d of the second sub-lens group frame 54 disengages from the telephoto linear guide slot 51f (FIG. 21(E)).

At this point, the rotation of the actuator ring 55 has been reversed (upon or after completion of the switching to the mutually close position on the telephoto side). As the actuator ring 55 rotates counterclockwise (i.e., moves to the left in FIG. 21), the effective surface 55c biases the contact surface N2 of the lug 54e to rotate the second sub-lens group frame 54 leftward until the contact surface M1 of the linear guide projection 54d abuts the rotation preventing surface 51a (FIGS. 21(F) and 21(G)). During the rotation of the actuator ring 55 and the second sub-lens group frame 54, the first sub-lens group frame 53 follows the shift leading surface 53c and the follower projection 54a of the second sub-lens group frame 54 so that the first sub-lens group frame 53 linearly moves away from the second sub-lens group frame 54. Ultimately, the follower projection 54a engages with the follower engaging recess 53e and forward movement of the first sub-lens group frame 53 with respect to the second sub-lens group frame 54 in the optical axis direction is stopped (FIG. 21(G)). Since the follower projections 54a and the follower engaging recesses 53f are spaced at equi-angular intervals therebetween, eccentricity between the first sub-lens group frame 53 and the second sub-lens group frame 54 is prevented, with all of the projections and the recesses in engagement. This completes the switching from the mutually close position on the telephoto side to the mutually distant position on the wide-angle side, resulting in the first sub-lens group S1 being in a mutually distant position with respect to the second sub-lens group S2 (i.e., mutually distant extremity). Note that the actuator ring 55 cannot rotate further in this direction.

Upon completion of switching to the mutually distant position on the wide-angle side, the rotation of the actuator ring 55 is reversed. The lug 54e (i.e., the second sub-lens group frame 54) moves rearward following the wide-angle side focus leading surface 55e until the linear guide projection 54d engages with the wide-angle linear guide slot 51d. This allows the linear projection 54d to move only along the direction of the optical axis (FIGS. 21(G) and 21(H)). Focusing is carried out on the wide-angle side from the intermediate focal length to the short focal length extremity, with the second sub-lens group frame 54 and the first sub-lens group frame 53 being moved integrally at the mutually distant extremity via the wide-angle side focus leading surface 55e.

Once the actuator ring 55 is rotated until the effective surface 55c abuts the contact surface N1 of the lug 54e, the linear guide projection 54d of the second sub-lens group frame 54 disengages from the wide-angle linear guide slot 51d, and the positions of the first sub-lens group frame 53 and the second sub-lens group frame 54 return back to the position shown at FIG. 21(A).

FIG. 22 shows the principle of how the focusing is carried out via the telephoto side-focus leading surface 55d and the wide-angle side-focus leading surface 55e. As the actuator ring 55 is rotated in a telephoto side focusing range pt (from an infinite photographic distance ∞ to a minimum photographic distance (object at a minimum distance) n), with the circular end surface N3 of the lug 54e in contact with the telephoto side focus leading surface 55d, the second sub-lens group frame 54 (whose rotation is confined by the linear guide projection 54d which is in engagement with the telephoto linear guide slot 51f) and the first sub-lens group frame 53 (i.e., the first sub-lens group S1 and the second sub-lens group S2) integrally moves forwardly or rearwardly along the optical axis to thereby carry out focusing. Similarly, as the actuator ring 55 is rotated in a wide-angle side focusing range pw (from an infinite photographic distance ∞ to a minimum photographic distance (object at a minimum distance) n), with the circular end surface N3 of the lug 54e in contact with the wide-angle side focus leading surface 55e, the second sub-lens group frame 54 (whose rotation is confined by the linear guide projection 54d which is in engagement with the wide-angle linear guide slot 51d) and the first sub-lens group frame 53 (i.e., the first sub-lens group S1 and the second sub-lens group S2) integrally moves forwardly or rearwardly along the optical axis to provide focusing.

In particular, focusing on the telephoto side and focusing on the wide-angle side are achieved by controlling the number of pulses counted by a encoder 64p (see FIG. 30) provided in a driving system which drives the actuator ring with respect to a reference position at which the linear guide projection 54d of the second sub-lens group frame 54 comes into contact with the rotation preventing surface 51a or 51b (i.e., the position where the rotation of the actuator ring 55 is reversed). For example, the number of pulses of the driving system required to move the focusing lens groups (i.e., the sub-lens groups S1 and S2) from a reference position to a position corresponding to a minimum photographic distance n, to a position corresponding to an infinite photographic distance ∞, and to a position corresponding to an intermediate photographic distance can be predetermined by taking the leading angles for the focus leading surfaces 55d and 55e into consideration. Accordingly, focusing can be properly carried out in accordance with the object distance information by managing the number of the pulses of the encoder.

Also, in the illustrated embodiment, the slopes of the telephoto side focus leading surface 55d and the wide-angle side focus leading surface 55e of the actuator ring 55 have opposite directions with respect to the circumferential direction thereof, but have the same absolute value, i.e., the slopes both incline forwards in the optical axis direction, and the lug 54e is shaped to be symmetrical with respect to the central axis extending in the middle of the contact surfaces N1 and N2 which are circumferentially spaced apart from each other. Accordingly, focusing can be carried out on the telephoto side in the same manner as on the wide-angle side. This facilitates focusing control.

Figure 17A:
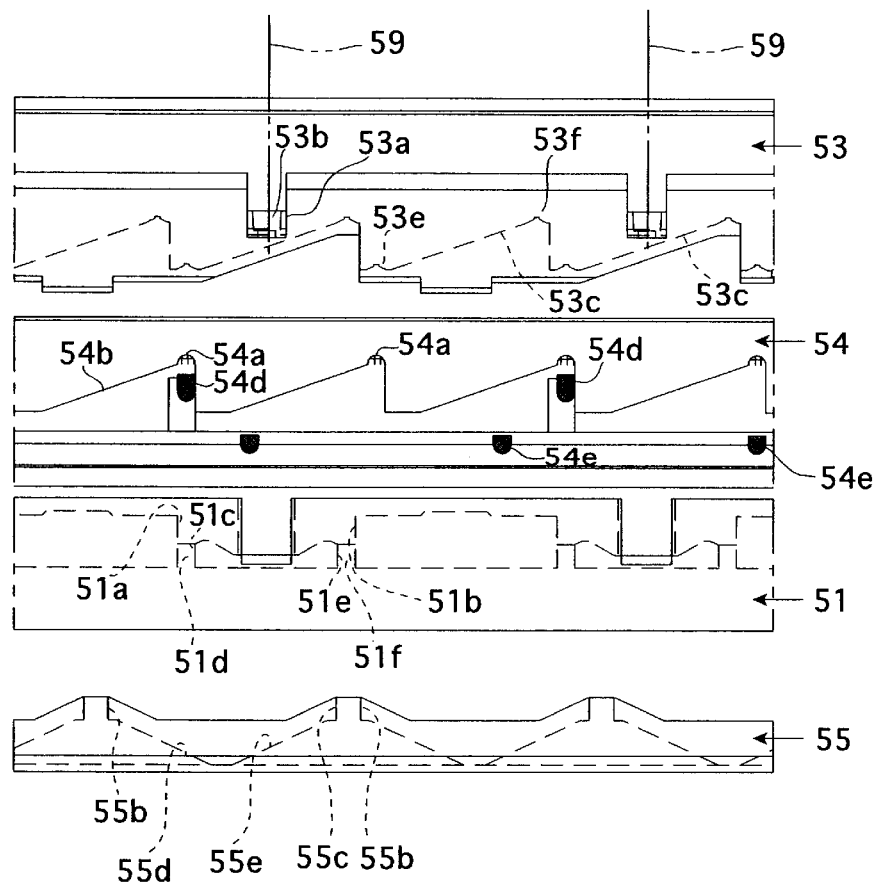
FIG. 17A is an exploded view in which components are exploded in the optical axis direction, wherein the first sub-lens group and the second sub-lens group are in the mutually distant position at the wide-angle side and are focused on an object at infinity.
Figure 17B:
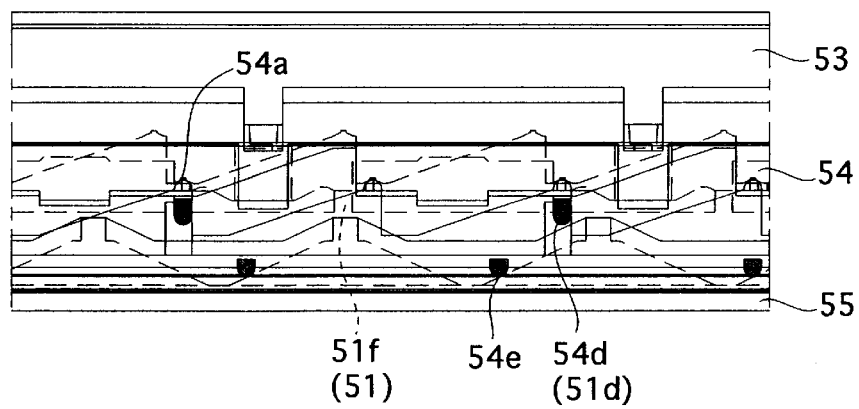
FIG. 17B is a developed view showing the components of FIG. 17A in actual engagement.
Figure 18A:
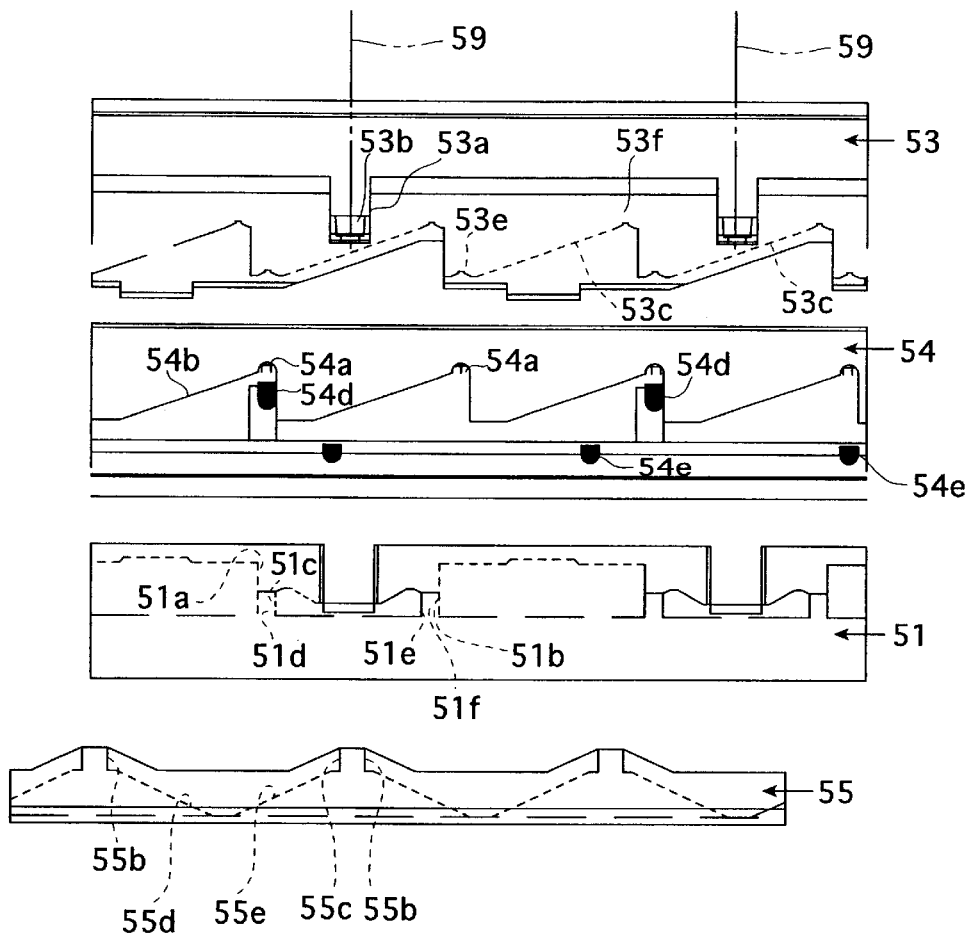
FIG. 18A is an exploded view in which components are exploded in the optical axis direction, wherein the first sub-lens group and the second sub-lens group are in the mutually distant position at the wide-angle side and are focused on an object at a minimum distance.
Figure 18B:
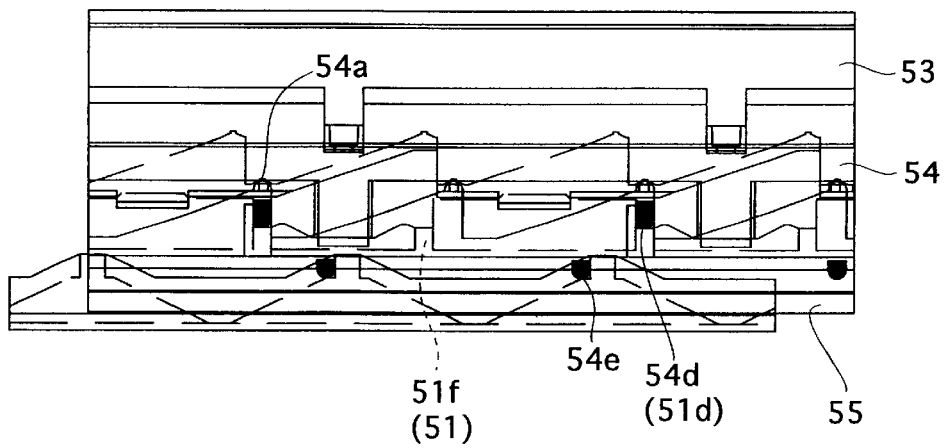
FIG. 18B is a developed view showing the components of FIG. 18A in actual engagement.
Figure 19A:
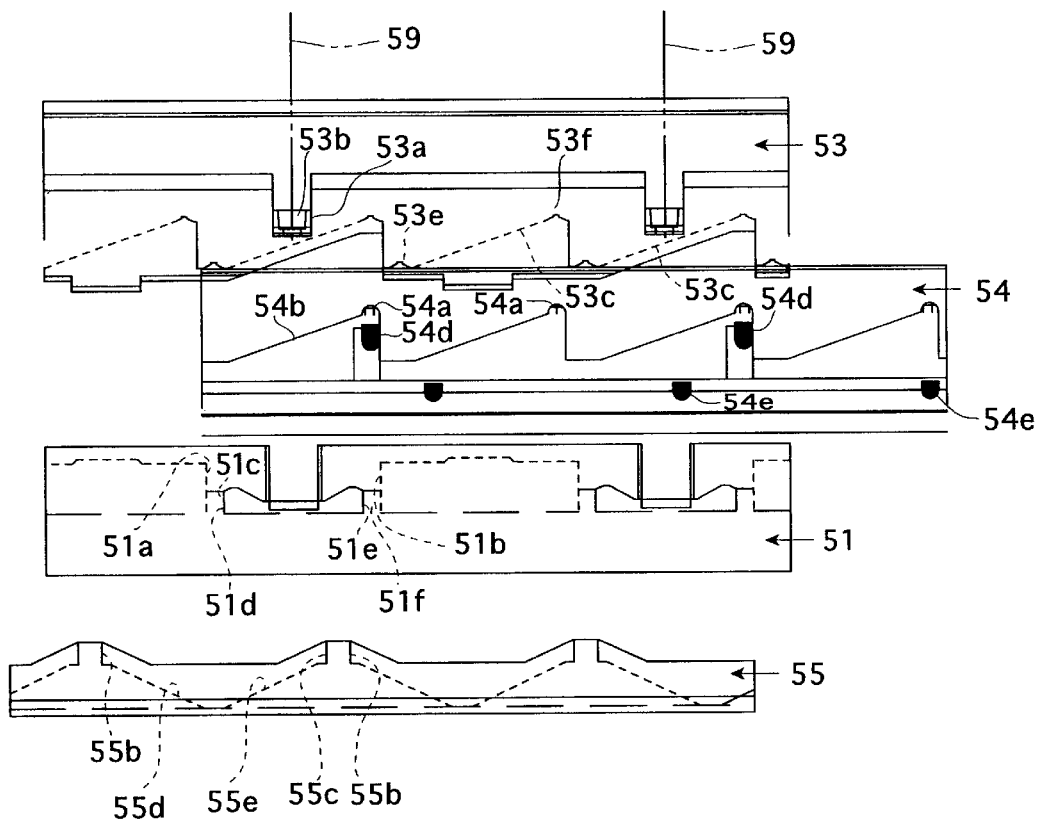
FIG. 19A is an exploded view in which components are exploded in the optical axis direction, wherein the first sub-lens group and the second sub-lens group are in the mutually close position at the telephoto side and are focused on an object at infinity.
Figure 19B:
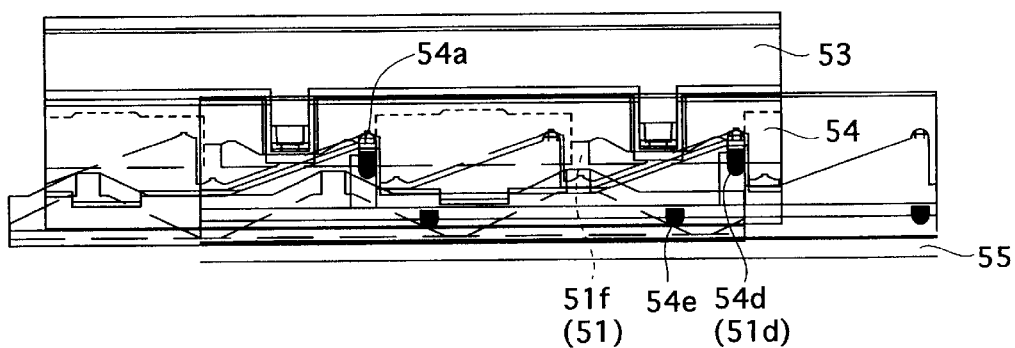
FIG. 19B is a developed view showing the components of FIG. 19A in actual engagement.
Figure 20A:
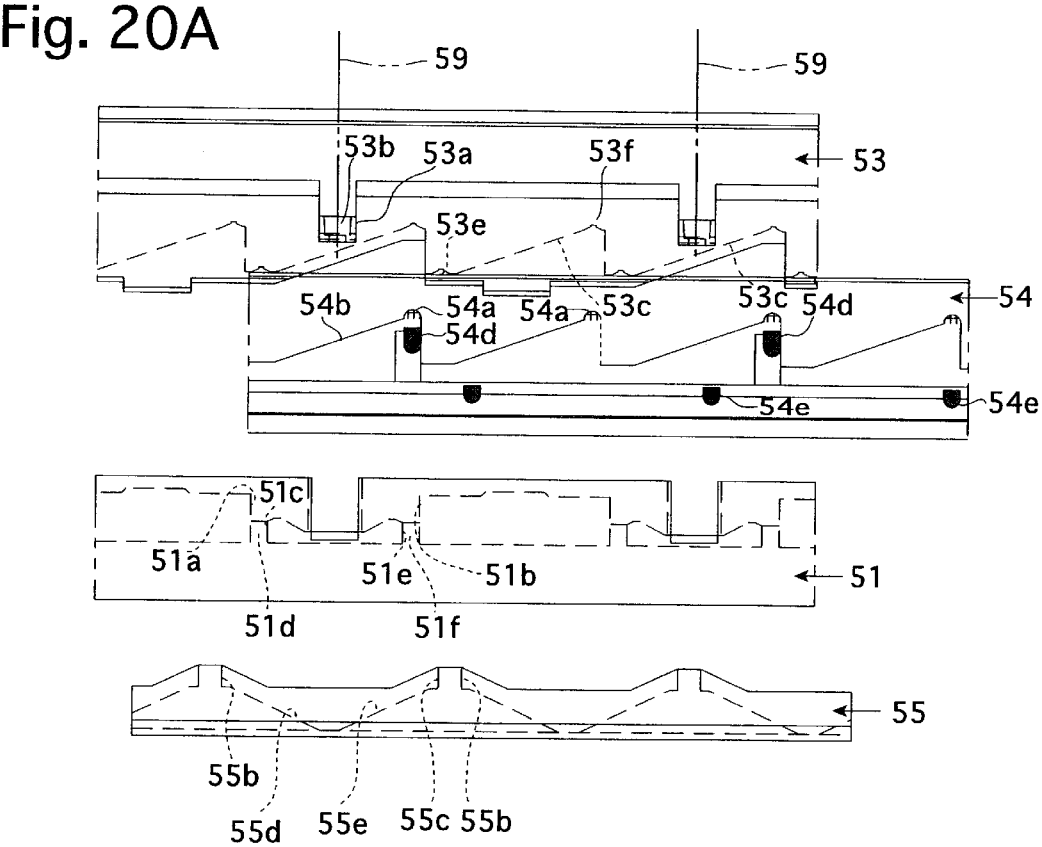
FIG. 20A is an exploded view in which components are exploded in the optical axis direction, wherein the first sub-lens group and the second sub-lens group are in the mutually close position at the telephoto side and are focused on an object at a minimum distance.
Figure 20B:
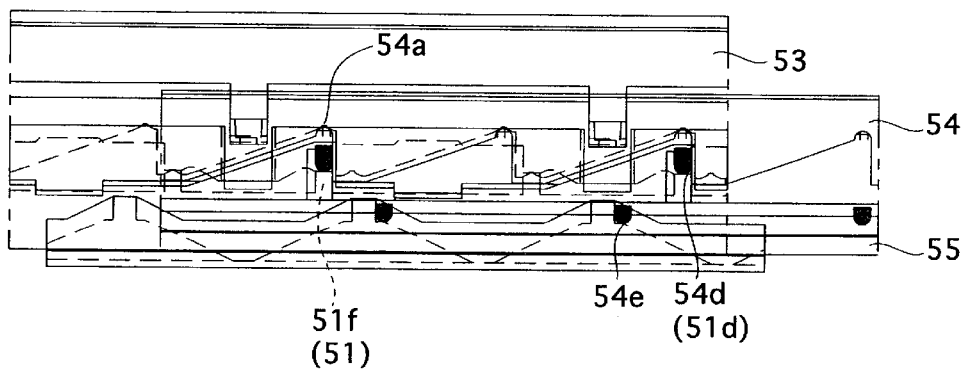
FIG. 20B is a developed view showing the components of FIG. 20A in actual engagement.

FIGS. 17A and 17B show an arrangement of the first sub-lens group frame 53, the second sub-lens group frame 54, the actuator ring 55, and the front shutter retaining ring 51 when the first sub-lens group frame 53 (i.e., the first sub-lens group S1) and the second sub-lens group frame 54 (i.e., the second sub-lens group S2) are in the mutually distant position at the wide-angle side, and are in a position so as to focus on an object at infinity. FIGS. 18A and 18B show an arrangement of the first sub-lens group frame 53, the second sub-lens group frame 54, the actuator ring 55, and the front shutter retaining ring 51 when the first sub-lens group frame 53 and the second sub-lens group frame 54 are in the mutually distant position on the wide-angle side, and are in a position so as to focus on an object at a minimum distance. FIGS. 19A and 19B show an arrangement of the first sub-lens group frame 53, the second sub-lens group frame 54, the actuator ring 55, and the front shutter retaining ring 51 when the first sub-lens group frame 53 and the second sub-lens group frame 54 are in the mutually close position on the telephoto side, and are in a position so as to focus on an object at infinity. FIGS. 20A and 20B show an arrangement of the first sub-lens group frame 53, the second sub-lens group frame 54, the actuator ring 55, and the front shutter retaining ring 51 when the first sub-lens group frame 53 and the second sub-lens group frame 54 are in the mutually close position on the telephoto side, and are in a position so as to focus on an object at a minimum distance.

The first sub-lens group frame 53, the second sub-lens group frame 54, the actuator ring 55, and the front shutter retaining ring 51 are shown separated in the optical axis direction in FIGS. 17A, 18A, 19A and 20A, and are shown in operation in FIGS. 17B, 18B, 19B and 20B.

Figure 29:
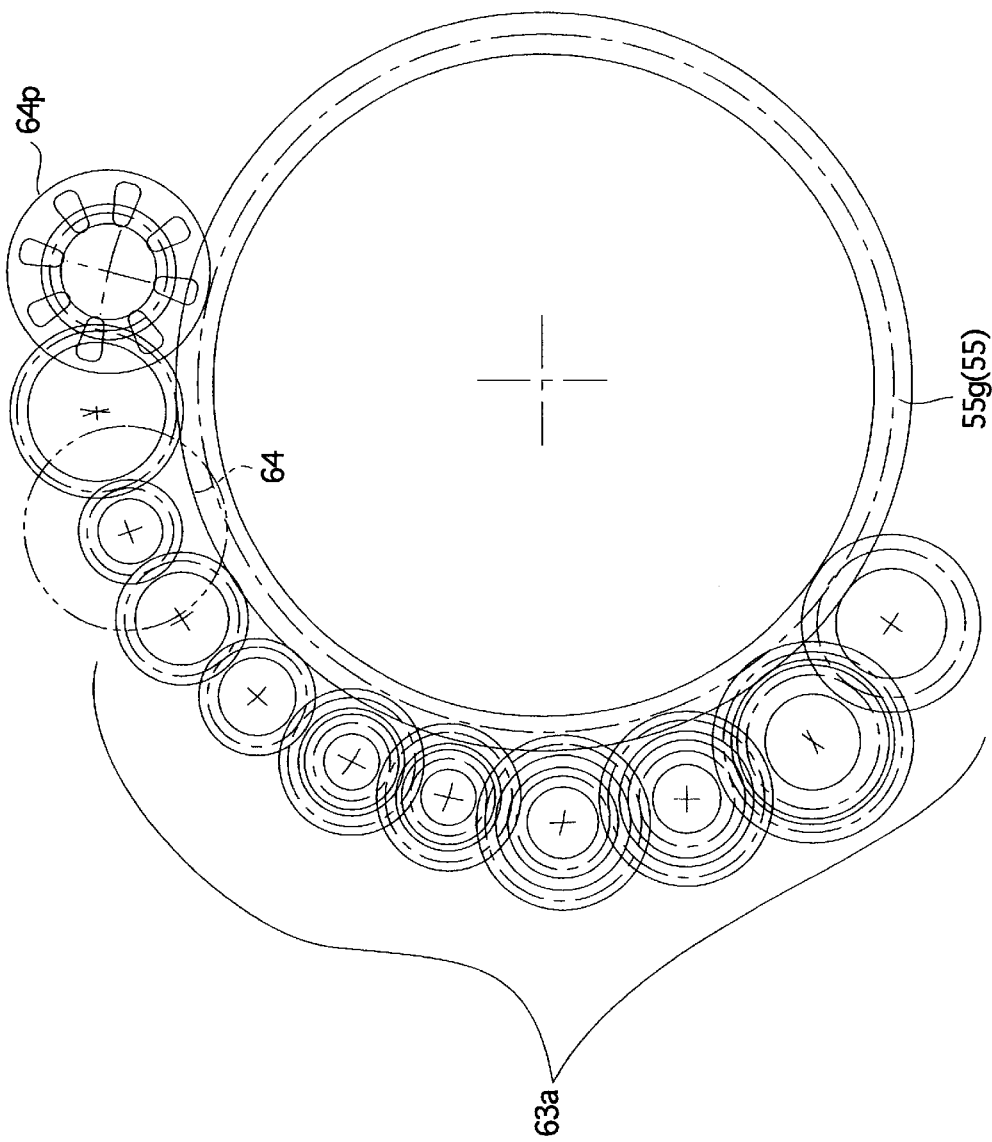
FIG. 29 is a front view showing an arrangement of reduction gears of a driving system of the actuator ring, the reduction gears being retained between the front shutter retaining ring and the gear holding ring.
Figure 30:
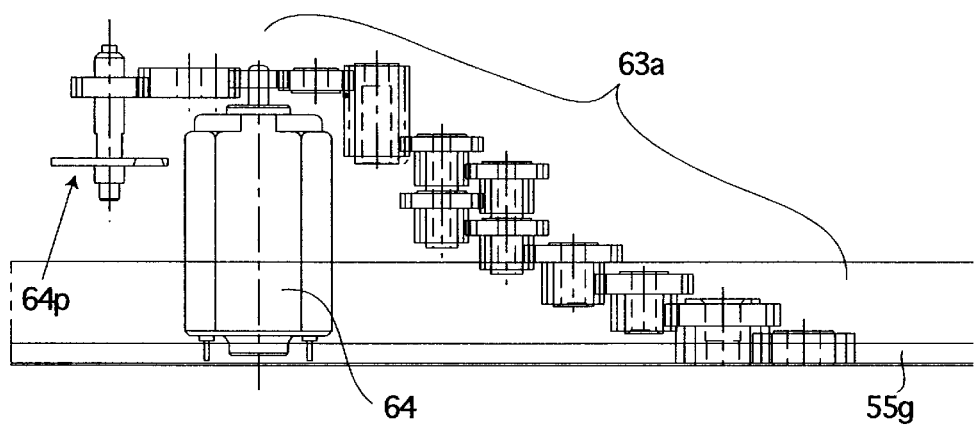
FIG. 30 is a developed plan view of FIG. 29.

Gear teeth 55g are formed over a circumference on the rear-end periphery of the actuator ring 55. As shown in FIGS. 12, 29 and 30, the gear teeth 55g engage with a series of reduction gears 63a. The series of reduction gears 63a are rotated in either direction by a bi-directional motor 64 which also includes the encoder 64p. The series of reduction gears 63a are held between the front shutter retaining ring 51 and the gear holding ring 56, and the bi-directional motor 64 is held by the rear shutter retaining ring 52. The gear teeth 55g of the actuator ring 55, which are formed over the entire periphery thereof, makes it easy for the three control recesses 55a to engage with the three lugs 54e of the second sub-lens group frame 54 at different relative rotational positions that are separated by 120°.

The lens shutter mechanism 57 and the diaphragm mechanism 58 are mounted on the rear shutter retaining ring 52. In particular, as shown in FIGS. 12, 15 and 16, the lens shutter mechanism 57 includes a shutter sector support plate 57a, three shutter sectors 57b, and a shutter drive ring 57c for opening and closing the shutter sectors 57b. The diaphragm mechanism 58 includes a diaphragm sector support plate 58a, three diaphragm sectors 58b, and a diaphragm drive ring 58c for opening and closing the diaphragm sectors 58b. These components are retained in the rear shutter retaining ring 52 by a sector holding ring 57d. The shutter sector 57b and the diaphragm sector 58b include a pair of dowels. One of the dowels is rotatably supported by the support plates 57a and 58a and the other is rotatably fitted to the drive rings 57c and 58c. The lens shutter mechanism 57 opens and closes an aperture formed by the shutter sectors 57b as the shutter drive ring 57c is rotated. The diaphragm mechanism 58 varies the size of an aperture formed by the diaphragm sectors 58b as the diaphragm drive ring 58c is rotated.

Sector gear teeth 57g are formed on a part of the periphery of the shutter drive ring 57c and engage with a series of reduction gears 63b that are sequentially arranged from a shutter drive motor 57m (see FIG. 12). When the shutter drive motor 57m is rotated in either direction, the aperture, which has been closed by the shutter sectors 57b, is momentarily opened and is then closed again. In the zoom lens barrel of the illustrated embodiment, the shutter sectors 57b serve both as a variable diaphragm to provide an aperture of an arbitrary size, and as a shutter. The shutter sectors 57b are electrically controlled so that the size of the aperture of the shutter sectors 57b (aperture value) and the length of time during which the aperture is left opened (i.e., shutter speed) can be varied depending on the exposure, upon the release of the shutter. Furthermore, the diaphragm drive ring 58c includes a lug 58g on the periphery thereof. The lug 58g engages with a diaphragm-controlling cam slot 48s formed on an inner surface of the linear guide ring 48 (see FIG. 10). Upon zooming, the linear guide ring 48 and the rear shutter retaining ring 52 (i.e., the diaphragm drive ring 58c) moves relative to each another in the optical axis direction. This causes the lug 58g to follow the diaphragm-controlling cam slot 48s so as to move in the circumferential direction. This in turn causes the diaphragm drive ring 58c to rotate and, as a result, the size of the aperture formed by the diaphragm sectors 58b is varied. The diaphragm sector 58b is provided to restrict the maximum value of the aperture diameter especially in the wide-angle side photographing range, and the degree of opening of the aperture is mechanically varied in accordance with the amount of extension of the zoom lens barrel.

Figure 31:
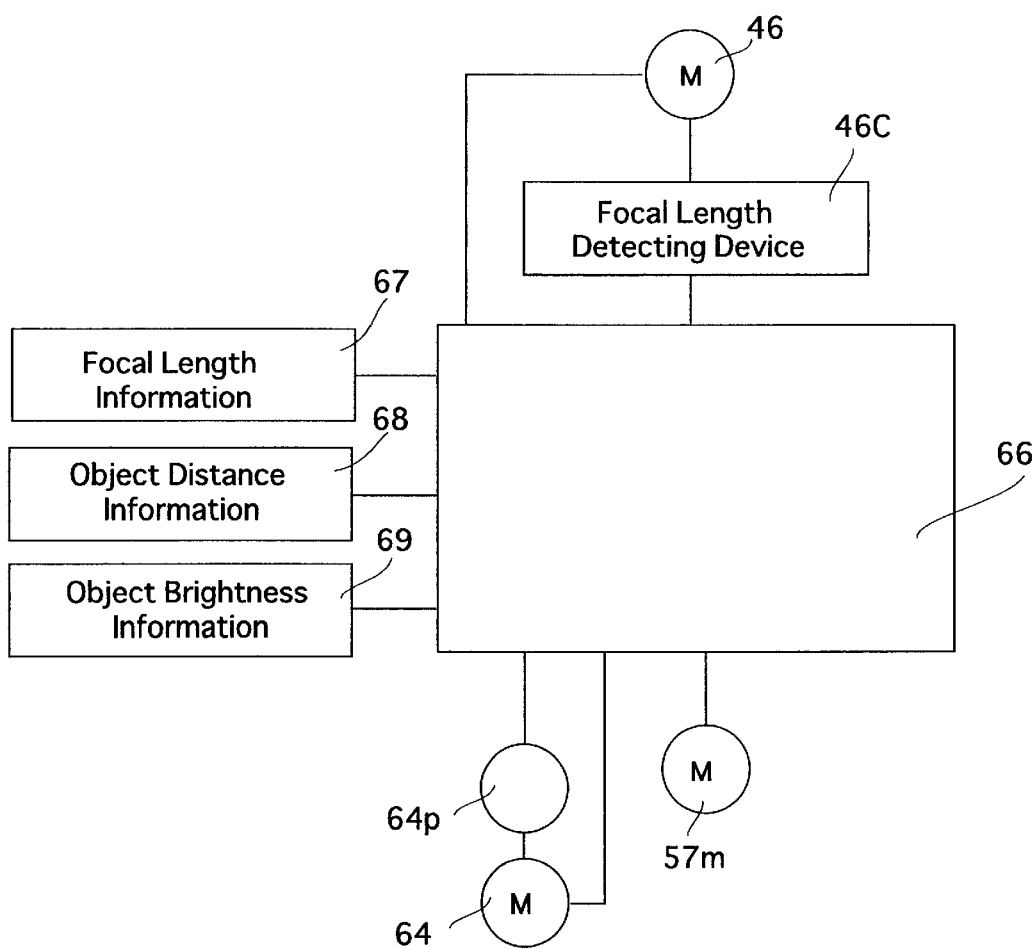
FIG. 31 is a block diagram showing a control system of the zoom lens barrel shown in FIG. 10.

As shown in FIG. 31, the zooming motor 46 for the cam ring 44, the bi-directional motor 64 for the actuator ring 55, and the shutter drive motor 57m for the lens shutter mechanism 57 are controlled by a control circuit (control device) 66. Focal length information 67, which is set by the user (photographer) via a zoom switch or the like, detected object distance information 68, object brightness information 69, information on rotational positions of the cam ring 44, which is provided by a focal length detecting device 46C, and information on rotational positions of the motor 64, which is provided by the encoder 64p, are inputted to the control circuit 66. The zooming motor 46, the bi-directional motor 64 and the shutter drive motor 57m are controlled according to the inputted information so that exposure is carried out under proper exposure conditions in accordance with the predetermined focal lengths. While the shutter sectors 57b serve both as a shutter and as a variable diaphragm, and the diaphragm sectors 58b restrict the aperture diameter upon photographing on the wide-angle side in this embodiment, the diaphragm sectors 58b can be provided as a motor-driven variable diaphragm mechanism.

In the illustrated embodiment, the focal length detecting device 46C (i.e., a rotational position detecting device for the cam ring 44) detects rotational positions of the cam groove 44f which correspond to the connection line CC (see FIG. 1), such that the control circuit 66 does not allow the cam ring 44 to stop in this section. If the zoom lens system is provided as a step zoom lens, positions at which the cam ring 44 stops are controlled in a stepwise manner. As described above, while the operations, corresponding to the preset focal length, distance to the object, and the brightness of the object, of the zoom lens barrel (i.e., photographing optical system) having the above-described switching lens group can be completed immediately before the shutter is released, the focal length set by an operator can be confirmed via a separate finder optical system (not shown) that is provided separate from the photographing optical system.

In the above-described zoom lens barrel, the first sub-lens group S1 is supported in the first sub-lens group frame 53 while the second sub-lens group S2 is supported in the second sub-lens group frame 54. The first sub-lens group frame 53 and the second sub-lens group frame 54 are supported in the switching lens group frame 50 in such a manner that the sub-lens group frames 53 and 54 are each allowed to move in the optical axis direction. The lens shutter mechanism 57 is secured to the switching lens group frame 50 in the rear (i.e., image side) of the second sub-lens group frame 54. The lens shutter mechanism 57 does not move in the optical axis direction with respect to the switching lens group frame 50.

Upon a focusing operation, the first sub-lens group frame 53 and the second sub-lens group frame 54 are moved along integrally, with respect to the lens shutter mechanism 57 by the focusing mechanism (i.e., actuator ring 55) and the cam mechanism (i.e., 55d, 55e and 54a) in the short-focal-length side zooming range and in the long-focal-length side zooming range. In this manner, adjustment of components/members as well as optical adjustments near the switching lens group 10 are facilitated. For example, with in the switching lens group frame 50, if the lens shutter mechanism 57 is fixed at a position behind the switching lens group 10, if optical problems occur within the switching lens group 10, the cause thereof is easier to establish due to have the lens shutter mechanism 57 as a reference.

Furthermore, the diaphragm mechanism 58 is mounted on the switching lens group frame 50 on the image side of the lens shutter 57. This construction enables more precise control of exposure.

While the first sub-lens group frame 53 and the second sub-lens group frame 54 are maintained in the mutually close position in the long-focal-length side zooming range and in the mutually distant position in the short-focal-length side zooming range in the embodiments shown, this relationship may be reversed depending on the construction of the zoom lens system.

As in the above-described embodiments, a smooth zooming action is achieved and unnecessary movements are reduced by moving the lens switching group frame 50 so that the path of the lens shutter mechanism 57 is not discontinuous in the short-focal-length side zooming range and in the long-focal-length side zooming range, which extend on both sides of the intermediate focal length.

In the zoom lens barrel using the lens barrel for the switching lens groups, positions at which the switching lens group frame 50, the first sub-lens group frame 53, and the second sub-lens group frame 54 stop during photographing can be practically determined in a stepwise manner along the zoom path.

As can be understood from the above discussion, the present invention provides a lens barrel for switching lens groups which is essential in achieving a compact zoom lens system with a high zooming ratio.

However, the zoom lens barrel according to the present invention is not limited to the illustrated embodiments. For example, while the mechanism for selectively moving the sub-lens group frames 53 and 54 includes the actuator ring 55, which is rotated in either direction, and the lens group shift mechanism (i.e., the shift cam mechanism) arranged between the first sub-lens group frame 53 and the second sub-lens group frame 54 in the embodiments shown, the first sub-lens group frame 53 and the second sub-lens group frame 54 can be advanced or retreated via known alternative mechanisms such as a feed screw mechanism and a solenoid mechanism.

Also, while the actuator ring 55 also serves as the focusing mechanism in the embodiments shown, a mechanism separate from the actuator ring 55 or other linear moving mechanisms may be employed to enable the first sub-lens group frame 53 and the second sub-lens group frame 54 to move integrally in the mutually close position (extremity) and in the mutually distant position (extremity) for focusing.

Note that, while the present invention has been described with regard to the first variable lens group 10 shown in FIGS. 1, 8 and 9, the mechanical construction of the above-described lens barrel is also applicable to the second variable lens group 20 in FIG. 2, the second variable lens group 20 in FIG. 3, the first variable lens group 10 in FIG. 4, the first variable lens group 10 in FIG. 5, the first variable lens group 10 in FIG. 6, and the first variable lens group 10 in FIG. 7 (the first lens L1 is integrally formed with the third lens L3).

Furthermore, obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A lens barrel having a zoom lens system, said zoom lens system including a plurality of variable power lens groups which are movable in an optical axis direction for varying the focal length of the zoom lens system; wherein at least one of said variable power lens groups includes a switching lens group having two sub-lens groups, one of said sub-lens groups constituting a movable sub-lens group that is selectively positioned at one of two movement extremities, in the optical axis direction, with respect to the other of said sub-lens groups;

said movable sub-lens group of said switching lens group is positioned at one of the movement extremities in a short-focal-length side zooming range from a short focal length extremity to an intermediate focal length, and at the other of the movement extremities in a long-focal-length side zooming range from the intermediate focal length to a long-focal-length extremity;

zoom paths of said two sub-lens groups of said switching lens group and the other of said variable power lens groups are discontinuous at the intermediate focal length and are defined so that the zoom lens system forms an image on a predetermined image plane in accordance with a position of said movable sub-lens group; and said switching lens group is a focusing lens group which integrally advances and retreats in the optical axis direction regardless of the zooming range, said lens barrel comprising:
  a first sub-lens group frame for supporting one of said sub-lens groups;
  a second sub-lens group frame for supporting the other of said sub-lens groups;
  a switching lens group frame for supporting said first sub-lens group frame and said second sub-lens group frame in this order from object side in such a manner that allows said first and second sub-lens group frames to move in the optical axis direction;
  a lens shutter mechanism secured to said switching lens group frame on the image side of said second sub-lens group frame; and
  a focusing mechanism for making said second sub-lens group frame advance or retreat, depending on the object distance, with respect to a reference position provided by said lens shutter mechanism secured to said switching lens group frame;
  wherein said first sub-lens group frame is moved along with said second sub-lens group frame in the optical axis direction in the long-focal-length zooming range and in the short-focal-length zooming range via said focusing mechanism.

2. The lens barrel according to claim 1, wherein said first sub-lens group frame is maintained in a mutually close position with respect to the second sub-lens group frame in the long-focal-length zooming range and maintained in a mutually distant position with respect to the second sub-lens group frame in the short-focal-length zooming range; and wherein said first sub-lens group frame is moved along integrally with said second sub-lens group frame by said focusing mechanism in the optical axis direction, in said mutually close position and in said mutually distant position.

3. The lens barrel according to claim 1, wherein said switching lens group frame is moved so that the path of said lens shutter mechanism is not discontinuous between said short-focal-length zooming range and said long-focal-length zooming range, which extend on both sides of the intermediate focal length.

4. The lens barrel according to claim 1, wherein a diaphragm mechanism is further secured to said switching lens group frame on the object side of said lens shutter mechanism.

5. A lens barrel having a zoom lens system, said zoom lens system including a plurality of variable power lens groups which are movable in an optical axis direction for varying the focal length of the zoom lens system, at least one of said variable power lens groups including a switching lens group having two sub-lens groups functioning optically in a mutually close position and in a mutually distant position, in the optical axis direction, said lens barrel comprising:
  a first sub-lens group frame for supporting one of said sub-lens groups;
  a second sub-lens group frame for supporting the other of said sub-lens groups;
  a switching lens group frame for supporting said first sub-lens group frame and said second sub-lens group frame in this order from object side in such a manner that allows said first and second sub-lens group frames to move in the optical axis direction;
  a lens shutter mechanism secured to said switching lens group frame on the image side of said second sub-lens group frame; and
  a focusing mechanism for making said second sub-lens group frame advance or retreat, depending on object distance, with respect to a reference position provided by said lens shutter mechanism secured to said switching lens group frame;
  wherein said first sub-lens group frame is moved along with said second sub-lens group frame in the optical axis direction in the long-focal-length zooming range and in the short-focal-length zooming range via said focusing mechanism.

* * * * *